(12) United States Patent
Watanabe et al.

(10) Patent No.: US 8,490,434 B2
(45) Date of Patent: Jul. 23, 2013

(54) PROCESS AND APPARATUS FOR PRODUCING GLASS MEMBER PROVIDED WITH SEALING MATERIAL LAYER AND PROCESS FOR PRODUCING ELECTRONIC DEVICE

(75) Inventors: Mitsuru Watanabe, Tokyo (JP); Motoshi Ono, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 13/355,127

(22) Filed: Jan. 20, 2012

(65) Prior Publication Data

US 2012/0111059 A1 May 10, 2012

Related U.S. Application Data

(63) Continuation of application No. PCT/JP2010/056035, filed on Apr. 1, 2010.

(30) Foreign Application Priority Data

Jul. 23, 2009 (JP) ................................. 2009-171812
Nov. 19, 2009 (JP) ................................. 2009-263540

(51) Int. Cl.
 *C03C 27/06* (2006.01)
 *C03B 23/203* (2006.01)
(52) U.S. Cl.
 USPC ............................................ 65/155; 156/99
(58) Field of Classification Search
 USPC ............ 65/146–151, 138–140, 155; 438/107, 438/455; 156/99; 428/34
 See application file for complete search history.

(56) References Cited

U.S. PATENT DOCUMENTS 4,405,722 A * 9/1983 Kokubu et al. .................. 501/15
5,733,828 A * 3/1998 Usui et al. ....................... 501/17
(Continued)

FOREIGN PATENT DOCUMENTS

JP 59131542 A * 7/1984
JP 2002-366050 12/2002
(Continued)

OTHER PUBLICATIONS

Yasui, Hideaki et al. JP 2002366050 Method for Manufacturing Image Display Device, Manufacturing Apparatus, and Image Display Device Manufactured by Using the Same. Translated by: The McElroy Translation Company, Jun. 2012.*

(Continued)

*Primary Examiner* — Jodi C Franklin
(74) *Attorney, Agent, or Firm* — Oblon, Spivak, McClelland, Maier & Neustadt, L.L.P.

(57) ABSTRACT

To provide a process for producing a glass member provided with a sealing material layer, capable of favorably forming a sealing material layer even in a case where the entire glass substrate cannot be heated.

A sealing material paste prepared by mixing a sealing material containing a sealing glass and a laser absorbent with an organic binder is applied to a sealing region of a glass substrate 2 in the form of a frame. The frame-form coating layer 8 of the sealing material paste is selectively heated by irradiation with a laser light 9 along the coating layer 8 to fire the sealing material while the organic binder in the coating layer 8 is burnt out to form a sealing material layer 7. Using such a sealing material layer 7, a space between two glass substrates is sealed.

13 Claims, 11 Drawing Sheets

U.S. PATENT DOCUMENTS

| | | | | |
|---|---|---|---|---|
| 6,817,917 | B1* | 11/2004 | Kado et al. | 445/25 |
| 6,998,776 | B2* | 2/2006 | Aitken et al. | 313/512 |
| 7,371,143 | B2* | 5/2008 | Becken et al. | 445/25 |
| 7,439,201 | B2* | 10/2008 | Drake et al. | 501/15 |
| 7,992,411 | B2* | 8/2011 | Boek et al. | 65/33.6 |
| 8,147,632 | B2* | 4/2012 | Banks et al. | 156/89.11 |
| 2002/0009557 | A1* | 1/2002 | Shibuya et al. | 428/34 |
| 2004/0069017 | A1* | 4/2004 | Li et al. | 65/43 |
| 2004/0119397 | A1* | 6/2004 | Sakamoto | 313/495 |
| 2005/0151475 | A1* | 7/2005 | Sasaki et al. | 313/582 |
| 2005/0181927 | A1* | 8/2005 | Hasegawa et al. | 501/79 |
| 2005/0189877 | A1* | 9/2005 | Ishida | 313/512 |
| 2006/0087224 | A1* | 4/2006 | Oki et al. | 313/504 |
| 2006/0284556 | A1* | 12/2006 | Tremel et al. | 313/512 |
| 2007/0001591 | A1* | 1/2007 | Tanaka | 313/504 |
| 2007/0170855 | A1* | 7/2007 | Choi et al. | 313/512 |
| 2008/0056326 | A1* | 3/2008 | Duan et al. | 372/99 |
| 2008/0110561 | A1* | 5/2008 | Lee et al. | 156/275.3 |
| 2008/0124558 | A1* | 5/2008 | Boek et al. | 428/427 |
| 2008/0136326 | A1* | 6/2008 | Nakamura et al. | 313/512 |
| 2009/0009063 | A1* | 1/2009 | Botelho et al. | 313/504 |
| 2009/0101271 | A1* | 4/2009 | Ishida | 156/145 |
| 2009/0133807 | A1* | 5/2009 | Amsden et al. | 156/105 |
| 2009/0153972 | A1* | 6/2009 | Nakamura et al. | 359/599 |
| 2009/0247385 | A1* | 10/2009 | Ide | 501/18 |
| 2009/0297861 | A1* | 12/2009 | Banks et al. | 428/428 |
| 2009/0297862 | A1* | 12/2009 | Boek et al. | 428/428 |
| 2009/0308105 | A1* | 12/2009 | Pastel et al. | 65/42 |
| 2010/0006228 | A1* | 1/2010 | Abe et al. | 156/356 |
| 2010/0065882 | A1* | 3/2010 | Matsumoto et al. | 257/99 |
| 2010/0099220 | A1* | 4/2010 | Street et al. | 438/107 |
| 2010/0137122 | A1* | 6/2010 | Nagai et al. | 501/70 |
| 2010/0189932 | A1* | 7/2010 | Niiyama et al. | 428/34 |
| 2010/0304513 | A1* | 12/2010 | Nguyen et al. | 438/27 |
| 2011/0014731 | A1* | 1/2011 | Nguyen et al. | 438/26 |
| 2011/0026236 | A1* | 2/2011 | Kondo et al. | 361/820 |
| 2011/0209813 | A1* | 9/2011 | Shibuya et al. | 156/89.12 |
| 2011/0223360 | A1* | 9/2011 | Shibuya et al. | 428/34 |
| 2011/0223371 | A1* | 9/2011 | Kawanami | 428/76 |
| 2011/0256407 | A1* | 10/2011 | Boek et al. | 428/428 |
| 2011/0284907 | A1* | 11/2011 | Nakamura et al. | 257/98 |
| 2012/0139133 | A1* | 6/2012 | Takahashi | 257/794 |
| 2012/0147538 | A1* | 6/2012 | Kawanami et al. | 361/679.01 |
| 2012/0156406 | A1* | 6/2012 | Banks et al. | 428/34.4 |
| 2012/0225506 | A1* | 9/2012 | Nguyen et al. | 438/26 |
| 2012/0235557 | A1* | 9/2012 | Lee | 313/495 |

FOREIGN PATENT DOCUMENTS

| | | | |
|---|---|---|---|
| JP | 2003-068199 | | 3/2003 |
| JP | 2006151774 A | * | 6/2006 |
| JP | 2006-524419 | | 10/2006 |
| JP | 2007223897 A | * | 9/2007 |
| JP | 2008-115057 | | 5/2008 |
| JP | 2008186697 A | * | 8/2008 |
| JP | 2012031001 A | * | 2/2012 |
| WO | WO 2004/095597 | | 11/2004 |
| WO | WO 2007067402 A2 | * | 6/2007 |
| WO | WO 2009/150976 | | 12/2009 |
| WO | WO 2009/157281 | | 12/2009 |
| WO | WO 2009/157282 | | 12/2009 |

OTHER PUBLICATIONS

International Search Report issued May 18, 2010 in PCT/JP2010/056035 filed Apr. 1, 2010.

* cited by examiner

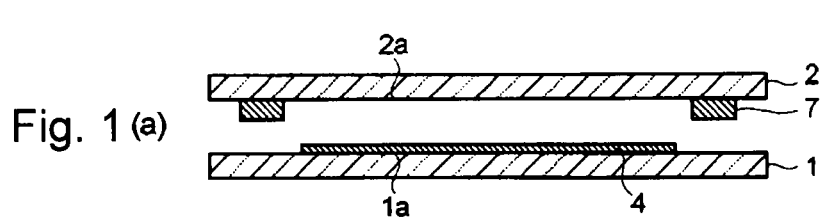
Fig. 1 (a)
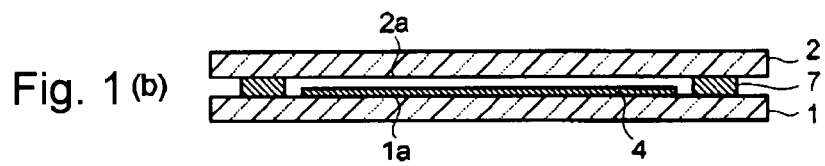
Fig. 1 (b)
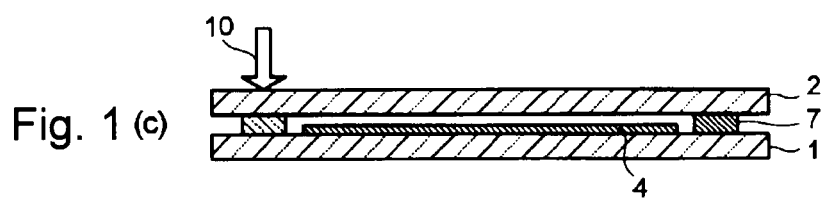
Fig. 1 (c)
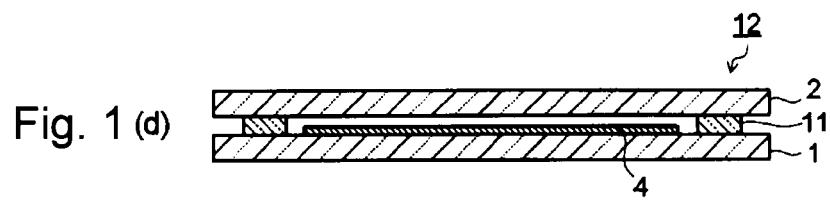
Fig. 1 (d)
Fig. 2
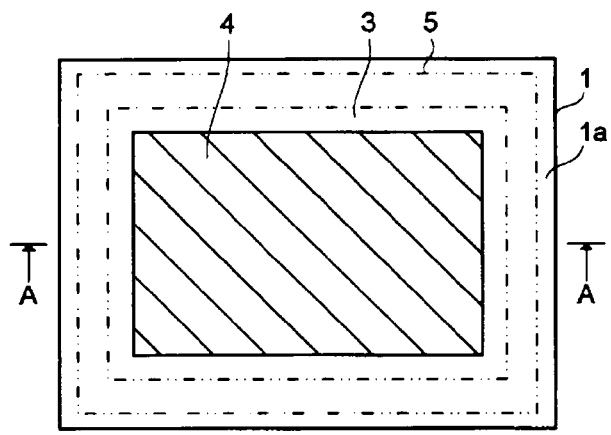
Fig. 3

PROCESS AND APPARATUS FOR PRODUCING GLASS MEMBER PROVIDED WITH SEALING MATERIAL LAYER AND PROCESS FOR PRODUCING ELECTRONIC DEVICE

TECHNICAL FIELD

The present invention relates to a process and an apparatus for producing a glass member provided with a sealing material layer, and a process for producing an electronic device.

BACKGROUND ART

A flat panel display (FPD) such as an organic EL (electroluminescence) display (OELD), or a plasma display panel (PDP) has such a structure that a glass substrate for an element having a light-emitting element formed and a glass substrate for sealing are disposed to face each other and the light-emitting element is sealed in a glass package comprising two such glass substrates bonded (Patent Document 1). A liquid crystal display device (LCD) also has such a structure that a liquid crystal is sealed between two glass substrates. Further, for a solar cell such as a dye-sensitized solar cell, application of a glass package having a solar cell element (photoelectric conversion element) sealed with two glass substrates has been studied (Patent Document 2).

As a sealing material to seal the space between two glass substrates, application of a sealing glass excellent in the moisture resistance, etc. is in progress. Since the sealing temperature of the sealing glass is at a level of from 400 to 600° C., properties of an electronic element portion of the OEL element or the like will be deteriorated when firing is conducted by using a conventional heating furnace. Accordingly, it has been attempted that a sealing material layer containing a sealing glass (glass frit) and a laser absorbent is disposed between sealing regions provided on the peripheral portions of two glass substrates, and the sealing material layer is irradiated with a laser light to heat and melt the sealing material layer to conduct sealing (Patent Documents 1 and 2).

In a case where laser sealing is applied, first, a sealing material is mixed with a vehicle to prepare a sealing material paste, which is applied to a sealing region of one glass substrate and heated to the firing temperature (a temperature of at least the softening temperature of the sealing glass) of the sealing material to melt the sealing glass and burn it on the glass substrate to form a sealing material layer. Further, in the procedure of heating the sealing material to the firing temperature, the organic binder is burnt out by thermal decomposition. Then, the glass substrate having the sealing material layer and the other glass substrate are laminated by means of the sealing material layer, and the laminate is irradiated with a laser light from the side of one of the glass substrates to heat and melt the sealing material layer thereby to seal an electronic element portion provided between the glass substrates.

To form the sealing material layer, a heating furnace is commonly used. Patent Document 3 discloses to conduct a first heating procedure of removing the organic binder in a step of forming the sealing material layer and a second heating procedure of burning the sealing material. In the first heating procedure, a glass substrate is heated from its rear side by means of a hot plate, an infrared heater, a heating lamp, a laser light or the like. In the second heating procedure, in the same manner as a conventional firing step, the entire glass substrate is heated by means of a heater in a heating furnace. In the process disclosed in Patent Document 3 also, burning of the sealing material is carried out by heating the entire glass substrate by means of a heating furnace.

By the way, for a glass package for FPD, an organic resin film such as a color filter is formed not only on a glass substrate for an element but also on a glass substrate for sealing. In such a case, if the entire substrate is heated in a heating furnace, the organic resin film will be damaged by heat, and accordingly a firing step by a common heating furnace cannot be applied even at the formation of the sealing material layer on the glass substrate for sealing. Further, in a dye-sensitized solar cell, an element film or the like is formed even on the facing substrate side, it is required to suppress thermal deterioration of the element film or the like in the firing step. Further, since the firing step by a heating furnace usually requires a long time and consumes a lot of energy, improvement is required from the viewpoint of the reduction in the production steps and the production cost and the energy saving also.

Patent Document 4 discloses application of a sealing material comprising a paste prepared by mixing low temperature melting glass (sealing glass), a binder and a solvent to one of panel substrates, followed by laser annealing the sealing material. However, the sealing glass may not uniformly be melted merely by laser annealing the sealing material. That is, only the vicinity of the surface of the coating layer of the sealing material may be melted, and melting of the sealing glass of the entire coating layer may be inhibited. If only the vicinity of the surface of the coating layer of the sealing material is melted and vitrified, emission of a gas formed by thermal decomposition of the binder to the outside will be deteriorated, thus leading to defects such as internal air bubbles and surface deformation of the sealing material layer. Such defects of the sealing material layer may deteriorate the air tightness of the panel and the bond strength.

Prior Art Documents
Patent Documents
 Patent Document 1: JP-A-2006-524419
 Patent Document 2: JP-A-2008-115057
 Patent Document 3: JP-A-2003-068199
 Patent Document 4: JP-A-2002-366050

DISCLOSURE OF INVENTION

Technical Problem

It is an object of the present invention to provide a process and an apparatus for producing a glass member provided with a sealing material layer and a process for producing an electronic device, each capable of forming a favorable sealing material layer with good reproducibility even in a case where the entire glass substrate cannot be heated.

Solution to Problem

The process for producing a glass member provided with a sealing material layer according to an embodiment of the present invention comprises a step of preparing a glass substrate having a sealing region; a step of applying a sealing material paste prepared by mixing a sealing material containing a sealing glass and a laser absorbent with an organic binder, to the sealing region of the glass substrate in the form of a frame; and a step of irradiating the frame-form coating layer of the sealing material paste with a laser light along it to heat the coating layer thereby to fire the sealing material while the organic binder in the coating layer is burnt out thereby to form a sealing material layer; wherein the frame-form coating layer of the sealing material paste is irradiated with the laser light so that the heating temperature of the sealing material is within a range of at least (T+213° C.) and at most (T+480° C.) relative to the softening temperature T (° C.) of the sealing glass.

The apparatus for producing a glass member provided with a sealing material layer according to a first embodiment of the present invention comprises a sample table on which a glass substrate having a frame-form coating layer of a sealing material paste prepared by mixing a sealing material containing a sealing glass and a laser absorbent with an organic binder, is to be placed; a laser light source to emit a laser light; a laser irradiation head having an optical system to irradiate the frame-form coating layer of the glass substrate with a laser light emitted from the laser light source; a moving mechanism to relatively change the positional relation between the sample table and the laser irradiation head; a scanning control part to control the moving mechanism so as to apply the laser light with scanning along the frame-form coating layer; and a power control part to control the power of the laser light so that the power densities at the irradiation initiation period and at the irradiation completion period of the laser light to be applied to the frame-form coating layer from the laser irradiation head are higher than the power density at the scanning irradiation period of the laser light along the frame-form coating layer excluding at the irradiation initiation period and at the irradiation completion period.

The apparatus for producing a glass member provided with a sealing material layer according to a second embodiment of the present invention comprises a sample table on which a glass substrate having a frame-form coating layer of a sealing material paste prepared by mixing a sealing material containing a sealing glass and a laser absorbent with an organic binder, is to be placed; a laser light source to emit a laser light; at least one pair of laser irradiation heads each having an optical system to irradiate the frame-form coating layer of the glass substrate with a laser light emitted from the laser light source; a power control part to control the powers of the laser lights of at least one pair to be applied to the frame-form coating layer from the laser irradiation heads of the at least one pair; a moving mechanism to relatively change the respective positional relations between the sample table and the laser irradiation heads of the at least one pair; and a scanning control part to control the moving mechanism so that at least one of the laser lights of the at least one pair is applied with scanning along the frame-form coating layer from the irradiation initiation position to the irradiation completion position where the laser lights of the at least one pair are on the same position.

A process for producing an electronic device according to an embodiment of the present invention comprises a step of preparing a first glass substrate having a first surface having a first sealing region provided thereon; a step of preparing a second glass substrate having a second surface having a second sealing region in accordance with the first sealing region provided thereon; a step of applying a sealing material paste prepared by mixing a sealing material containing a sealing glass and a laser absorbent with an organic binder to the second sealing region of the second glass substrate in the form of a frame; a step of irradiating the frame-form coating layer of the sealing material paste with a laser light for firing along it to heat it so that the heating temperature of the sealing material is within a range of at least (T+213° C.) and at most (T+480° C.) relative to the softening temperature T (° C.) of the sealing glass, thereby to fire the sealing material while the organic binder in the coating layer is burnt out thereby to form a sealing material layer; a step of laminating the first glass substrate and the second glass substrate via the sealing material layer so that the first surface and the second surface face each other; and a step of irradiating the sealing material layer with a laser light for sealing through the first glass substrate or the second glass substrate to melt the sealing material layer thereby to seal an electronic element portion provided between the first glass substrate and the second glass substrate.

Advantageous Effects of Invention

According to the process for producing a glass member provided with a sealing material layer according to an embodiment of the present invention, a favorable sealing material layer can be formed with good reproducibility even in a case where the entire glass substrate cannot be heated. Accordingly, even in a case where such a glass substrate is used, an electronic device excellent in the reliability, the sealing property, etc. can be produced with good reproducibility.

BRIEF DESCRIPTION OF DRAWINGS

FIG. 1 is cross-sectional views illustrating the procedure for production of an electronic device according to an embodiment of the present invention.

FIG. 2 is a plan view illustrating a first glass substrate used in the procedure for production of an electronic device shown in FIG. 1.

FIG. 3 is a cross-sectional view along the line A-A in FIG. 2.

DESCRIPTION OF EMBODIMENTS

Figure 4:
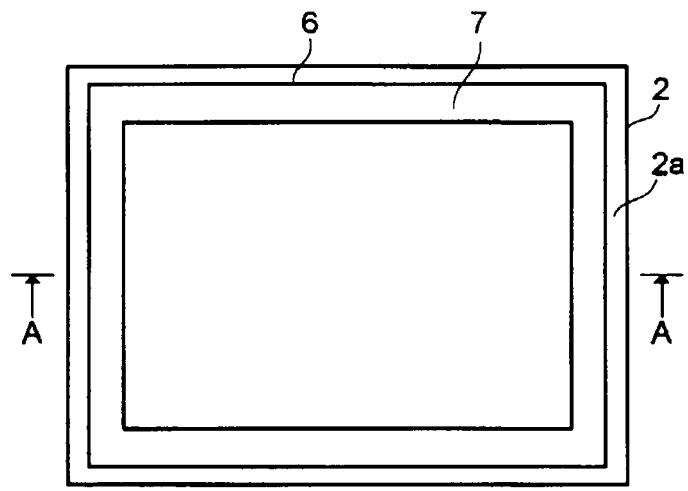
FIG. 4 is a plan view illustrating a second glass substrate used in the procedure for production of an electronic device shown in FIG. 1.

Now, the embodiments of the present invention will be described with reference to drawings.

FIGS. 1 to 6 are views illustrating the procedure for production of an electronic device according to the embodiment of the present invention. An electronic device to which the production process according to the embodiment of the present invention is applied may be a FPD such as an OELD, a PDP or a LCD, an illumination apparatus employing a light-emitting element such as an OEL element, or a sealed type solar cell such as a dye-sensitized solar cell.

First, as shown in FIG. 1(a), a first glass substrate 1 and a second glass substrate 2 are prepared. For the first and second glass substrates 1 and 2, a glass substrate formed by e.g. alkali-free glass or soda lime glass having a known composition may, for example, be used. Alkali-free glass has a thermal expansion coefficient at a level of from 35 to 40× $10^{-7}/°$ C. Soda lime glass has a thermal expansion coefficient at a level of from 80 to 90× $10^{-7}/°$ C.

The first glass substrate 1 has a surface 1a having an element region 3 provided thereon as shown in FIGS. 2 and 3. On the element region 3, an electronic element portion 4 corresponding to an electronic device as an object is provided. The electronic element portion 4 is provided with an OEL element in the case of an OELD or an OEL illumination, a plasma light-emitting element in the case of a PDP, a liquid crystal display element in the case of a LCD, or a dye-sensitized solar cell element (dye-sensitized photoelectric conversion element) in the case of a solar cell. The electronic element portion 4 provided with a light-emitting element such as an OEL element or a dye-sensitized solar cell element or the like has a known structure. The embodiment is not limited to the element structure of the electronic element portion 4.

Figure 5:
FIG. 5 is a cross-sectional view along the line A-A in FIG. 4.

On the surface 1a of the first glass substrate 1, a first sealing region 5 is provided along the outer periphery of the element region 3. The first sealing region 5 is provided so as to surround the element region 3. The second glass substrate 2 has a surface 2a facing the surface 1a of the first glass substrate 1. On the surface 2a of the second glass substrate 2, a second sealing region 6 corresponding to the first sealing region 5 is provided as shown in FIGS. 4 and 5. The first and second sealing regions 5 and 6 correspond to regions on which a sealing layer is to be formed (a region on which a sealing material layer is to be formed with respect to the second sealing region 6).

The electronic element portion 4 is provided between the surface 1a of the first glass substrate 1 and the surface 2a of the second glass substrate 2. In the procedure for production of an electronic device as shown in FIG. 1, the first glass substrate 1 constitutes a glass substrate for an element, and has an element structure such as an OEL element or a PDP element formed as the electronic element portion 4 on the surface 1a. The second glass substrate 2 is to constitute a glass substrate for sealing the electronic element portion 4 formed on the surface 1a of the first glass substrate 1. However, the structure of the electronic element portion 4 is not limited thereto.

For example, in a case where the electronic element portion 4 is a dye-sensitized solar cell element or the like, an element film such as a wiring film or an electrode film to form an element structure is formed on the surface 1a or 2a of the first or second glass substrate 1 or 2. The element film constituting the electronic element portion 4 and an element structure based thereon are formed on at least one of the surfaces 1a and 2a of the first and second glass substrates 1 and 2. Further, on the surface 2a of the second glass substrate 2 constituting the glass substrate for sealing, as described above, an organic resin film such as a color filter is formed in some cases. The production process according to such an embodiment is particularly effective when an organic resin film, an element film or the like is formed on the surface 2a of the second glass substrate 2.

On the second sealing region 6 of the second glass substrate 2, as shown in FIGS. 1(a), 4 and 5, a sealing material layer 7 in the form of a frame is formed. The sealing material layer 7 is a fired layer of a sealing material containing a sealing glass and a laser absorbent. The sealing material comprises a sealing glass as the main component and a laser absorbent and as the case requires, an inorganic filler such as a low expansion filler incorporated. The sealing material may contain fillers and additives other than the above, as the case requires.

For the sealing glass (glass frit), for example, low temperature melting glass such as tin-phosphate glass, bismuth glass, vanadium glass or lead glass may be used. Among them, considering the sealing property (adhesion property) to the glass substrates 1 and 2 and the reliability (bonding reliability and hermetically sealing property) and in addition, the influences over the environment and the human body, it is preferred to use a low melting sealing glass comprising tin-phosphate glass or bismuth glass.

The tin-phosphate glass (glass frit) preferably has a composition comprising from 55 to 68 mass % of SnO, from 0.5 to 5 mass % of $SnO_2$ and from 20 to 40 mass % of $P_2O_5$ (basically the total amount will be 100 mass %). SnO is a component to make the glass have a low melting point. If the content of SnO is less than 55 mass %, the viscosity of glass will be high and the sealing temperature will be too high, and if the content exceeds 68 mass %, the glass will not be vitrified.

$SnO_2$ is a component to stabilize glass. If the content of $SnO_2$ is less than 0.5 mass %, $SnO_2$ will be separated and precipitate in the glass softened and melted at the time of the sealing operation, and the fluidity will be impaired and the sealing operation property will be decreased. If the content of $SnO_2$ exceeds 5 mass %, $SnO_2$ is likely to precipitate in the melt of the low temperature melting glass. $P_2O_5$ is a component to form a glass skeleton. If the content of $P_2O_5$ is less than 20 mass %, the glass will not be vitrified, and if the content exceeds 40 mass %, deterioration of the weather resistance which is a drawback specific to phosphate glass may occur.

Here, the ratios (mass %) of SnO and $SnO_2$ in the glass frit can be determined as follows. First, the glass frit (low temperature melting glass powder) is subjected to acid decomposition, and then the total amount of Sn atoms contained in the glass frit is measured by ICP emission spectroscopy. Then, the amount of $Sn^{2+}$ (SnO) can be obtained by the iodometric titration after the acid decomposition, and thus the amount of $Sn^{4+}$ ($SnO_2$) is determined by subtracting the above obtained amount of $Sn^{2+}$ from the total amount of the Sn atoms.

The glass formed by the above three components has a low glass transition point and is suitable as a sealing material at low temperature, and it may contain e.g. a component to form a glass skeleton such as $SiO_2$, or a component to stabilize the glass such as ZnO, $B_2O_3$, $Al_2O_3$, $WO_3$, $MoO_3$, $Nb_2O_5$, $TiO_2$, $ZrO_2$, $Li_2O$, $Na_2O$, $K_2O$, $Cs_2O$, MgO, CaO, SrO or BaO as an optional component. However, if the content of the optional component is too high, the glass will be unstable, whereby devitrification may occur, or the glass transition point or the softening point may be increased. Thus, the total content of the optional components is preferably at most 30 mass %. The glass composition in such a case is adjusted so that the total amount of the basic components and optional components is basically 100 mass %.

The bismuth glass (glass frit) preferably has a composition comprising from 70 to 90 mass % of $Bi_2O_3$, from 1 to 20 mass % of ZnO and from 2 to 12 mass % of $B_2O_3$ (basically the total content will be 100 mass %). $Bi_2O_3$ is a component to form a glass network. If the content of $Bi_2O_3$ is less than 70 mass %, the softening point of the low temperature melting glass will be high, whereby sealing at low temperature will be difficult. If the content of $Bi_2O_3$ exceeds 90 mass %, the glass will hardly be vitrified and in addition, the thermal expansion coefficient tends to be too high.

ZnO is a component to lower the thermal expansion coefficient or the like. If the content of ZnO is less than 1 mass %, the glass will hardly be vitrified. If the content of ZnO exceeds 20 mass %, the stability at the time of formation of the low temperature melting glass will be decreased, and devitrification is likely to occur. $B_2O_3$ is a component to form a glass skeleton and to broaden a range within which the glass can be vitrified. If the content of $B_2O_3$ is less than 2 mass %, the glass will hardly be vitrified, and if it exceeds 12 mass %, the softening point will be too high, whereby sealing at low temperature will be difficult even if a load is applied at the time of the sealing.

The glass formed by the above three components has a low glass transition point and is suitable as a sealing material at low temperature, and it may contain an optional component such as $Al_2O_3$, $CeO_2$, $SiO_2$, $Ag_2O$, $MoO_3$, $Nb_2O_3$, $Ta_2O_5$, $Ga_2O_3$, $Sb_2O_3$, $Li_2O$, $Na_2O$, $K_2O$, $Cs_2O$, CaO, SrO, BaO, $WO_3$, $P_2O_5$ or $SnO_x$ (wherein x is 1 or 2). However, if the content of the optional components is too high, the glass will be unstable, whereby devitrification may occur, or the glass transition point or the softening point may be increased. Thus, the total content of the optional components is preferably at most 30 mass %. The glass composition in such a case is adjusted so that the total amount of the basic components and optional components is basically 100 mass %.

The sealing glass further contains a laser absorbent. As the laser absorbent, at least one metal selected from Fe, Cr, Mn, Co, Ni and Cu, or a compound such as an oxide containing the above metal may be used. Further, a pigment other than the above may also be used. The content of the laser absorbent is preferably within a range of from 0.1 to 10 vol % to the sealing material. If the content of the laser absorbent is less than 0.1 vol %, the sealing material layer 7 may not sufficiently be melted. If the content of the laser absorbent exceeds 10 vol %, a portion in the vicinity of an interface with the second glass substrate 2 may locally generate heat, or the fluidity of the sealing material at the time of melting may be deteriorated, whereby the adhesion to the first glass substrate 1 may be decreased.

Further, the sealing material may contain a low-expansion filler as the case requires. As the low-expansion filler, it is preferred to use at least one member selected from silica, alumina, zirconia, zirconium silicate, aluminum titanate, mullite, cordierite, eucryptite, spodumene, a zirconium phosphate compound, a quarts solid solution, soda lime glass and borosilicate glass. The zirconium phosphate compound may be $(ZrO)_2P_2O_7$, $NaZr_2(PO_4)_3$, $KZr_2(PO_4)_3$, $Ca_{0.5}Zr_2(PO_4)_3$, $NbZr(PO_4)_3$, $Zr_2(WO_3)(PO_4)_2$ or a composite compound thereof. The low-expansion filler is one having a lower thermal expansion coefficient than the sealing glass.

The content of the low-expansion filler is properly set so that the thermal expansion coefficient of the sealing glass is close to the thermal expansion coefficients of the glass substrates 1 and 2. The low-expansion filler is contained preferably in an amount of from 15 to 50 vol % to the sealing material, although it depends on the thermal expansion coefficients of the sealing glass and the glass substrates 1 and 2. In a case where each of the glass substrates 1 and 2 is formed by alkali-free glass (thermal expansion coefficient: 30 to 40× $10^{-7}$/° C.), it is preferred to add a relatively large amount (for example from 30 to 50 vol %) of the low-expansion filler. In a case where each of the glass substrates 2 and 3 is formed by soda lime glass (thermal expansion coefficient: 80 to 90× $10^{-7}$/° C.), it is preferred to add a relatively small amount (for example from 5 to 40 vol %) of the low-expansion filler.

Figure 6A:
FIG. 6 is cross-sectional views illustrating the procedure for formation of a sealing material layer on the second glass substrate in the procedure for production of an electronic device shown in FIG. 1.
Figure 6B:
Figure 6C:

The sealing material layer 7 is formed as follows. A step of forming the sealing material layer 7 will be described with reference to FIG. 6. FIG. 6 is to illustrate the embodiment of the process for producing a glass member provided with a sealing material layer of the present invention. First, a laser absorbent, a low expansion filler and the like are blended with a sealing glass to prepare a sealing material, which is mixed with a vehicle to prepare a sealing material paste.

The vehicle may, for example, be one having a resin such as methyl cellulose, ethyl cellulose, carboxymethyl cellulose, oxyethyl cellulose, benzyl cellulose, propyl cellulose or nitrocellulose dissolved in a solvent such as terpineol, butyl carbitol acetate or ethyl carbitol acetate, or one having an acrylic resin of e.g. methyl (meth)acrylate, ethyl (meth)acrylate, butyl (meth)acrylate or 2-hydroxyethyl methacrylate dissolved in a solvent such as methyl ethyl ketone, terpineol, butyl carbitol acetate or ethyl carbitol acetate.

The resin component in the vehicle functions as an organic binder in the sealing material and is required to be burnt out before the sealing material is fired. The viscosity of the sealing material paste is fitted to the viscosity in accordance with an apparatus which applies the paste to the glass substrate 2, and may be adjusted by the ratio of the resin component (binder) to the solvent (organic solvent or the like) or the ratio of the sealing material to the vehicle. To the sealing material paste, known additives for a glass paste, such as an antifoaming agent or a dispersing agent may be added. For preparation of the sealing material paste, a known method employing a rotary mixer equipped with a stirring blade, a roll mill, a ball mill or the like may be applied.

As shown in FIG. 6(*a*), the sealing material paste is applied to the sealing region 6 of the second glass substrate 2 and dried to form a coating layer 8. The sealing material paste is applied to the second sealing region 6 employing, for example, a printing method such as screen printing or gravure printing, or applied along the second sealing region 6 using a dispenser or the like. The coating layer 8 is preferably dried, for example, at a temperature of at least 120° C. for at least 10 minutes. The drying step is carried out to remove the solvent in the coating layer 8. If the solvent remains in the coating layer 8, the organic binder may not sufficiently be burnt out in the following firing step (laser firing step).

Then, as shown in FIG. 6(*b*), the coating layer (dried film) 8 of the sealing material paste is irradiated with a laser light 9 for firing. By irradiating the coating layer 8 with the laser light 9 along it to selectively heat it, the sealing material is fired while the organic binder in the coating layer 8 is burnt out to form a sealing material layer 7 (FIG. 6(*c*)). The laser light 9 for firing is not particularly limited, and a laser light from e.g. a semiconductor laser, a carbon dioxide laser, an excimer laser, a YAG laser or a HeNe laser may be employed. The same applies to the after-mentioned laser light for sealing.

The coating layer 8 is irradiated with the laser light 9 for firing along it so that the heating temperature of the coating layer 8 is within a range of at least (T+213° C.) and at most (T+480° C.) relative to the softening temperature T (° C.) of the sealing glass. The laser light 9 is preferably applied with scanning along the coating layer 8. The scanning rate of the laser light 9 during the irradiation is preferably within a range of at least 0.1 mm/sec and at most 5 mm/sec. The softening temperature T of the sealing glass is a temperature at which the sealing glass is softened and flows but is not crystallized. Further, the temperature of the coating layer 8 when irradiated with the laser light 9 is a value measured by a radiation thermometer.

When the coating layer 8 is irradiated with the laser light 9 so that the temperature of the coating layer 8 is within a range of at least (T+213° C.) and at most (T+480° C.), the sealing glass in the sealing material is melted and quenched and solidified, whereby the sealing material is burnt on the second glass substrate 2 to form the sealing material layer 7. The temperature of the coating layer 8 is preferably within a range of at least (T+220° C.) and at most (T+450° C.). Under conditions of irradiation with the laser light 9 such that the temperature of the coating layer 8 does not reach (T+213° C.), only the surface portion of the coating layer 8 is melted, and the entire coating layer 8 cannot uniformly be melted. On the other hand, under conditions of irradiation with the laser light 9 such that the temperature of the coating layer 8 exceeds (T+480° C.), cracks, fractures and the like are likely to form on the glass substrate 2 and the sealing material layer (fired layer) 7.

By irradiating the coating layer 8 with the laser light 9 for firing with scanning so that the temperature of the coating layer 8 is at the above-described heating temperature, the organic binder in the coating layer 8 is thermally decomposed and burnt out. Since the coating layer 8 is irradiated with the laser light 9 along it with scanning, a portion located ahead of the moving direction of the laser light 9 is properly pre-heated. Thermal decomposition of the organic binder proceeds by the pre-heated portion located ahead of the moving direction of the laser light 9 in addition to when the corresponding portion of the coating layer 8 is directly irradiated with the laser light 9, whereby the organic binder in the coating layer 8 can effectively and efficiently be burnt out. Specifically, the remaining carbon amount in the sealing material layer 7 can be reduced. The remaining carbon may increase the impurity gas concentration in the glass panel.

In order to realize the step of removing the organic binder, the laser light 9 is preferably applied with scanning at a scanning rate within a range of at least 0.1 mm/sec and at most 5 mm/sec, more preferably within a range of at least 1 mm/sec and at most 5 mm/sec. If the scanning rate of the laser light 9 is less than 0.1 mm/sec, the glass substrate 2 will excessively be heated, whereby cracks, fractures and the like are likely to form. If the scanning rate of the laser light 9 exceeds 5 mm/sec, only the surface portion will be melted and vitrified before the entire coating layer 8 is uniformly heated, whereby emission of the gas formed by thermal decomposition of the organic binder to the outside will be deteriorated. Accordingly, air bubbles may form in the interior of the sealing material layer 7, or deformation due to the air bubbles may form on the surface. The carbon amount remaining in the sealing material layer 7 will also increase. If a space between the glass substrates 1 and 2 is sealed by using a sealing material layer 7 from which the organic binder is poorly burnt out, the bond strength between the sealing layer and the glass substrates 1 and 2 may be decreased, or the airtightness of the glass panel may be decreased.

Further, when the laser light 9 is applied at a scanning rate within a range of at least 0.1 mm/sec and at most 5 mm/sec and the heating temperature of the coating layer 8 is within a range of at least (T+213° C.) and at most (T+480° C.), the laser light 9 has a power density of preferably within a range of from 200 to 900 W/cm$^2$, more preferably within a range of from 300 to 800 W/cm$^2$. If the power density of the laser light 9 is less than 200 W/cm$^2$, the entire coating layer 8 cannot uniformly be heated. If the power density of the laser light 9 exceeds 900 W/cm$^2$, the glass substrate 2 will excessively be heated, whereby cracks, fractures and the like are likely to form.

FIG. 6(*b*) illustrates a state where the coating layer 8 is irradiated with the laser light 9 from above, however, the coating layer 8 may be irradiated with the laser light 9 through the glass substrate 2. For example, to shorten the firing time of the coating layer 8 of the sealing material paste, a high power of the laser light 9 and a high scanning rate are effective. For example, if the coating layer 8 is irradiated with the high power laser light 9 from above, only the surface portion of the coating layer 8 may be vitrified. Vitrification of only the surface portion of the coating layer 8 will cause various problems as described above. Whereas, when the coating layer 8 is irradiated with the laser light 9 from the glass substrate 2 side, even if the coating layer 8 is vitrified from a portion irradiated with the laser light 9, the gas formed by thermal decomposition of the organic binder can be released from the surface of the coating layer 8. Further, it is also effective to irradiate the coating layer 8 with the laser light 9 from above and below.

The shape of the irradiation spot with the laser light 9 is not particularly limited. The irradiation spot with the laser light 9 is commonly circular, but is not limited to circular. The irradiation spot with the laser light 9 may be elliptic with the width direction of the coating layer 8 being a minor axis.

According to the laser light 9 adjusted to achieve an elliptic irradiation spot, the area of irradiation with the laser light 9 relative to the coating layer 8 can be broadened, and further, the scanning rate of the laser light 9 can be increased, whereby the firing time of the coating layer 8 can be shortened.

The step of firing the coating layer 8 with the laser light 9 is not necessarily restricted by the thickness of the coating layer 8, but is effective for a coating layer 8 having such a thickness that the thickness after firing (thickness of the sealing material layer 7) is at most 20 µm. The sealing material layer 7 preferably has a thickness of at most 20 µm. In the case of the coating layer 8 having such a thickness that the thickness after firing exceeds 20 µm, the entire coating layer may not uniformly be heated by the laser light 9. In such a case, only the surface portion of the coating layer 8 is melted and vitrified, whereby removability of the organic binder and the thermally decomposed gas thereof tends to be decreased. The thickness of the sealing material layer 7 is practically preferably at least 5 µm.

In the step of forming the sealing material layer 7 according to this embodiment, the coating layer 8 of the sealing material paste is selectively heated by irradiation with the laser light 9 for firing. Accordingly, even in a case where an organic resin film such as a color filter, an element film or the like is formed on the surface 2a of the second glass substrate 2, the sealing material layer 7 can be favorably formed without imparting thermal damage to the organic resin film, the element film or the like. Further, as excellent removability of the organic binder is achieved, the sealing material layer 7 excellent in the sealing property, the reliability and the like can be obtained.

Further, of course, the step of forming the sealing material layer 7 by the laser light 9 for firing is applicable to a case where no organic resin film, element film or the like is formed on the surface 2a of the second glass substrate 2, and in such a case also, the sealing material layer 7 excellent in the sealing property, the reliability and the like can be obtained. Further, in the firing step by the laser light 9, the energy consumption is low as compared with a firing step by a conventional heating furnace, and such contributes to the reduction in the production steps and the production cost. Accordingly, the step of forming the sealing material layer 7 by the laser light 9 is effective also from the viewpoint of the energy saving, the cost reduction, etc.

By the way, in a case where the coating layer 8 of the sealing material paste is fired by irradiation with the laser light 9 along it, the irradiation initiation position with the laser light 9 on the coating layer 8 and the irradiation completion position are on the same position. Depending on the fluidity of the sealing glass when melted and the conditions of irradiation with the laser light 9, the sealing glass shrinks due to the surface tension, the reduction in the void or the like at the completion of the irradiation with the laser light 9, which may cause a gap at the irradiation completion position in some cases. Although the sealing material layer 7 having a gap may be used for hermetic sealing e.g. by setting the conditions for the sealing step and setting the steps (e.g. pre-heating), the sealing step will be complicated, thus leading to an increase in the production steps and the production cost.

For such points, it is effective to increase the fluidity of the sealing glass at the time of completion of the irradiation with the laser light 9. As a specific means to increase the fluidity of the sealing glass, (1) an increase of the power density at the irradiation initiation period and at the irradiation completion period with the laser light 9, (2) use of at least one pair of laser lights as the laser light 9 so that the two laser lights are on the same position at the irradiation initiation period and at the irradiation completion period, or (3) laminating a back plate on the coating layer 8 of the sealing material paste and irradiating the coating layer 8 with the laser light 9 in such a state, may, for example, be mentioned.

The method of suppressing the gap to be formed in the sealing material layer 7 is not limited to a means of increasing the fluidity of the sealing glass. As a method of suppressing the gap other than the means of increasing the fluidity of the sealing glass, a simultaneous heating method utilizing e.g. a galvano scanner may be mentioned. By a galvano scanner, the entire coating layer 8 of the sealing material paste can simultaneously and uniformly be heated, whereby formation of the gap can be prevented.

By the above-described means (1), the power density of the laser light 9 is controlled so that the power densities at the irradiation initiation period and at the irradiation completion period with the laser light 9 are higher than the power density at the scanning irradiation period (excluding at the irradiation initiation period and at the irradiation completion period) with the laser light 9 along the frame-form coating layer 8 of the sealing material paste. It is considered that when the laser light 9 applied along the frame-form coating layer 8 arrives at the irradiation completion position, the sealing glass at the irradiation starting position is already cooled, whereby the surface tension is superior to the fluidity of the sealing glass heated and melted by the laser light 9, and accordingly the sealing glass shrinks at the irradiation completion position with the laser light 9 to form a gap.

To solve such a problem, shrinkage of the sealing glass at the irradiation completion position can be suppressed by increasing the power of the laser light 9 at the irradiation completion period so as to increase the fluidity of the sealing glass. Further, shrinkage of the sealing glass at the irradiation completion period with the laser light 9 can be more suppressed by increasing the power of the laser light 9 at the irradiation initiation period so as to improve vitrification of the sealing glass (glass frit). Accordingly, formation of the gap at the irradiation completion position with the laser light 9 can be suppressed.

Figure 7:
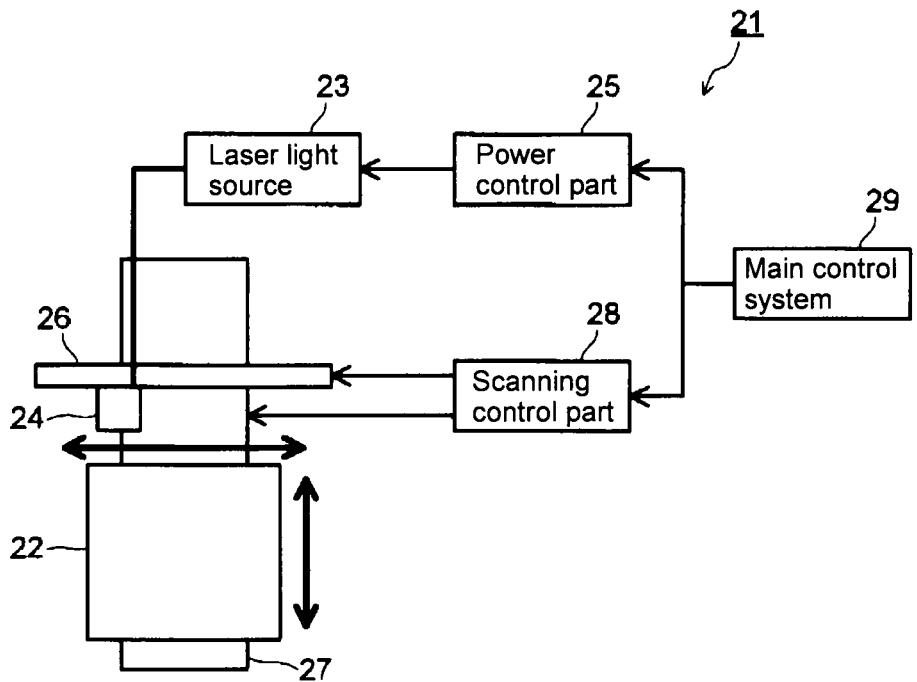
FIG. 7 is a plan view illustrating an apparatus for producing a glass member provided with a sealing material layer according to a first embodiment.
Figure 8:
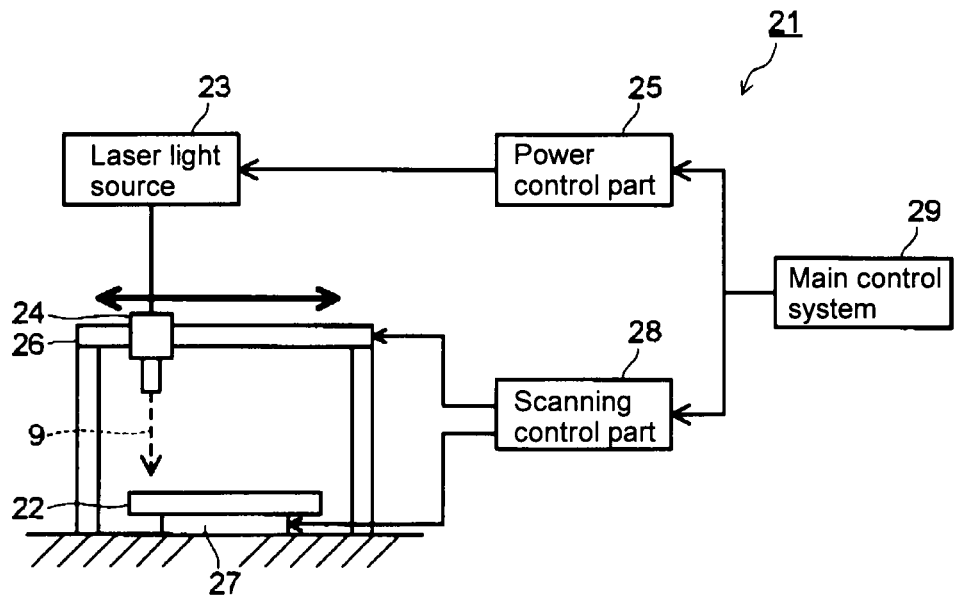
FIG. 8 is a front view illustrating the apparatus for producing a glass member provided with a sealing material layer shown in FIG. 7.

One example of a laser firing apparatus applicable to the means (1) is shown in FIGS. 7 and 8. FIGS. 7 and 8 illustrate an apparatus for producing a glass member provided with a sealing material layer according to the first embodiment of the present invention. A laser firing apparatus (an apparatus for producing a glass member provided with a sealing material layer) 21 shown in these Figs. comprises a sample table 22 on which a glass substrate 2 (not shown in FIGS. 7 and 8) having a frame-form coating layer 8 of a sealing material paste is to be placed, a laser light source 23, and a laser irradiation head 24 to irradiate the coating layer 8 with a laser light emitted from the laser light source 23.

The power of the laser light emitted from the laser light source 23 is controlled by a power control part 25. The power control part 25 controls the power of the laser light by controlling an electric power to be input into the laser light source 23 for example. Further, the power control part 25 may have a power modulator to control the power of the laser light emitted from the laser light source 23. Although not shown, the laser irradiation head 24 has an optical system which focuses a laser light emitted from the laser light source 23, shapes it into a predetermined irradiation spot and applies it to the coating layer 8. The optical system will be described hereinafter.

The laser irradiation head 24 is capable of moving in an X-direction by an X stage 26. The sample table 22 is capable of moving in a Y-direction by a Y stage 27. The X stage 26 is fixed above the sample table 22 so that it moves in a direction perpendicular to the moving direction of the Y stage 27. The laser irradiation head 24 is placed on the X stage 26. The positional relation between the laser irradiation head 24 and the sample table 22 is capable of relatively changing by the X stage 26 and the Y stage 27. That is, it is possible to apply the laser light 9 from the laser irradiation head 24 along the frame-form coating layer 8 with scanning by the X stage 26 and the Y stage 27. The X stage 26 and the Y stage 27 constitute a moving mechanism. The X stage 26 and the Y stage 27 are controlled by a scanning control part 28.

The laser firing apparatus 21 comprises a main control system 29 which comprehensively controls the power control part 25 and the scanning control part 28. Further, the laser firing apparatus 21 comprises a radiation thermometer (not shown) to measure the firing temperature (heating temperature) of the frame-form coating layer 8. The laser firing apparatus 21 preferably comprises a suction nozzle, a blast nozzle or the like to prevent the organic binder burnt out from the frame-form coating layer 8 from being attached to the optical system or the glass substrate 2.

Figure 9:
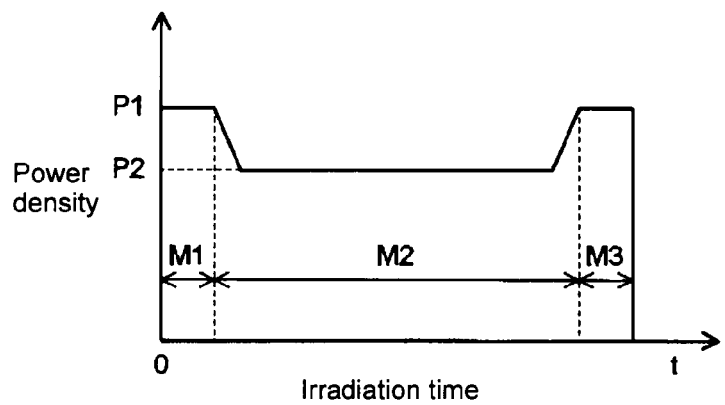
FIG. 9 is a view illustrating an example to control the power density of a laser light in the apparatus for producing a glass member provided with a sealing material layer according to a first embodiment.
Figure 10:
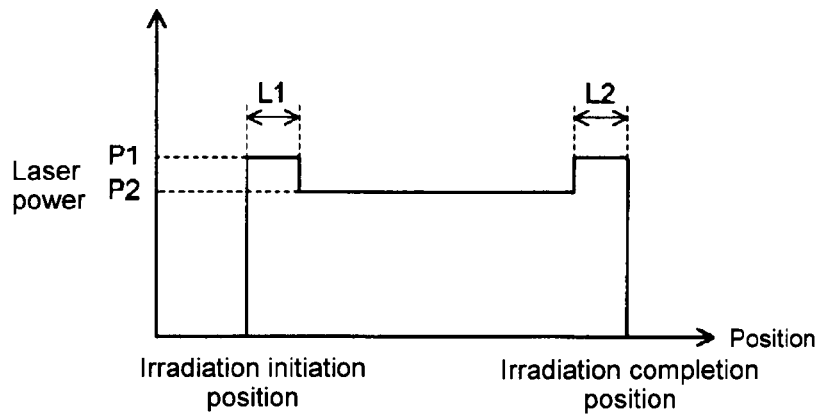
FIG. 10 is a view illustrating an example to control the power of a laser light in the apparatus for producing a glass member provided with a sealing material layer according to a first embodiment.

The power control part 25 is to control the power of the laser light 9 so that the power densities at the irradiation initiation period and at the irradiation completion period with the laser light 9 from the laser irradiation head 24 are higher than the power density at the scanning irradiation period along the frame-form coating layer 8 with the laser light 9 excluding at the irradiation initiation period and at the irradiation completion period. FIG. 9 shows an example to control the power density of the laser light 9 by the power control part 25. The power density of the laser light 9 is controlled by the power of the laser light 9 when the area of the irradiation spot of the laser light 9 is constant. FIG. 10 shows an example to control the power of the laser light 9.

As shown in FIG. 9, first, the laser light 9 having a power density D1 (power P1) is applied to the irradiation initiation position of the frame-form coating layer 8 to initiate scanning. The power density D1 is held only during the irradiation initiation period M1, and after the irradiation initiation period M1, the power density is lowered to P2 (the power of the laser light 9 is lowered to P2). The laser light 9 having the power density D2 (power P2) is applied with scanning along the coating layer 8 (scanning irradiation period M2). Then, when the laser light 9 reaches the irradiation completion period M3, the power density is raised to D1 again (the power of the laser light 9 is raised to P1). The laser light 9 having the power density D1 is brought to the irradiation completion position (the same position as the irradiation initiation position) to complete the irradiation with the laser light 9.

The power density D1 of the laser light 9 is preferably set so that the heating temperature of the coating layer 8 at the irradiation initiation period M1 and at the irradiation completion period M3 is within a range of at least (T+350° C.) and at most (T+550° C.) relative to the softening temperature T (° C.) of the sealing glass. The power density D2 of the laser light 9 is preferably set so that the heating temperature of the sealing material at the scanning irradiation period M2 is within a range of at least (T+213° C.), and at most (T+480° C.) relative to the softening temperature T (° C.) of the sealing glass. The scanning rate of the laser light 9 is as described above.

The ratio of the power density D1 to the power density D2 of the laser light 9, i.e. D1/D2 is preferably from 1.1 to 3.0, more preferably from 1.2 to 2.0.

By adjusting the temperature of the coating layer 8 at the irradiation initiation period M1 and at the irradiation completion period M3 to be at least (T+350° C.), shrinkage of the sealing glass at the irradiation completion period M3 with the laser light 9 can be suppressed with good reproducibility. However, if the temperature of the coating layer 8 at the irradiation initiation period M1 and at the irradiation completion period M3 is too high, cracks, fractures and the like are likely to form on the glass substrate 2 or the sealing material layer (fired layer) 7, and accordingly the temperature of the coating layer 8 at the irradiation initiation period M1 and at the irradiation completion period M3 is preferably at most (T+550° C.).

The temperature of the coating layer 8 at the scanning irradiation period M2 is preferably within a range of at least (T+213° C.) and at most (T+480° C.) relative to the softening temperature T (° C.) of the sealing glass so as to suppress cracks and fractures on the glass substrate 2 or the sealing material layer (fired layer) 7 with good reproducibility. Specific values of the power density D1 at the irradiation initiation period M1 and at the irradiation completion period M3 and the power density D2 at the scanning irradiation period M2 are preferably selected properly within the above-described range of from 200 to 900 W/cm$^2$ considering the heating temperature of the coating layer 8 and the scanning rate of the laser light 9.

The irradiation initiation period M1 of the laser light 9 is preferably within 5 seconds from initiation of the irradiation. If the period at the power density D1 is too long, cracks, fractures and the like are likely to form on the glass substrate 2 or the sealing material layer (fired layer) 7. However, if the irradiation initiation period M1 of the laser light 9 is too short, vitrification of the sealing glass (glass frit) by the high power laser light 9 cannot sufficiently be increased. Accordingly, the irradiation initiation period M1 of the laser light 9 is preferably at least 1 second from the initiation of the irradiation. Likewise, the irradiation completion period M3 is preferably within a range of at least 1 second and at most 5 seconds based on the irradiation completion point of the laser light 9.

The irradiation initiation period M1 and the irradiation completion period M3 of the laser light 9 are preferably set depending on the scanning rate of the laser light 9. As shown in FIG. 10, the laser light 9 at the power P1 corresponding to the irradiation initiation period M1 is preferably applied to the distance L1 from the irradiation initiation position to the position of from 0.1 to 25 times the spot diameter of the laser light 9. Likewise, the laser light 9 at the power P1 corresponding to the irradiation completion period M3 is preferably applied to the distance L2 from the position of from 0.1 to 25 times the spot diameter of the laser light 9 based on the irradiation completion position to the irradiation completion position. By adjusting the range of irradiation with the laser light 9 at the power P1 to be ranges of the distance L1 and the distance L2, formation of the gap in the sealing material layer 7 can be suppressed with good reproducibility.

In this case, the heating temperature of the coating layer 8 at the irradiation initiation period M1 and at the irradiation completion period M3 is set to be higher than the heating temperature of the coating layer 8 at the scanning irradiation period M2 by controlling the power density of the laser light 9, however, the heating temperature of the coating layer 8 at the irradiation initiation period M1 and at the irradiation completion period M3 can be made higher than the heating temperature of the coating layer 8 at the scanning irradiation period M2 also by applying the laser light 9 to a certain position (the irradiation initiation position and the irradiation completion position/the same position) for a certain time at the initiation of the irradiation and at the completion of the irradiation for example. Formation of the gap can be suppressed also by controlling the scanning rate of the laser light 9.

Figure 11:
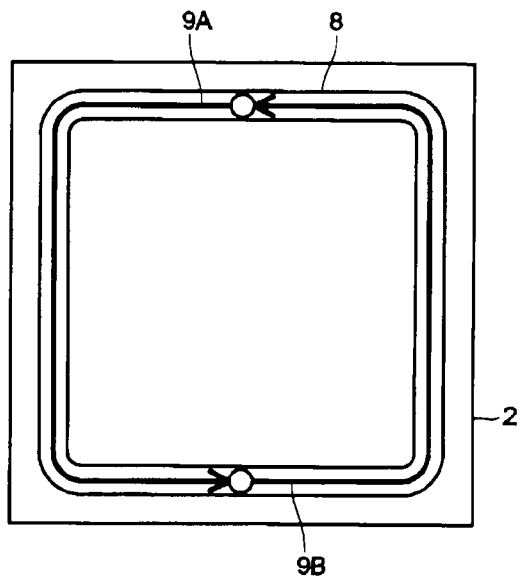
FIG. 11 is a view illustrating another example of application of a laser light in the apparatus for producing a glass member provided with a sealing material layer according to a first embodiment.

Further, the laser light 9 to be applied to the coating layer 8 of the sealing material paste 8 is not limited to one, and a plurality of laser lights 9 may be applied to the coating layer 8. FIG. 11 illustrates an example of application of two laser lights 9A and 9B. In a case where two laser lights 9A and 9B are used, the coating layer 8 is divided into two regions. The irradiation initiation position and the irradiation completion position are set at a portion where the two regions are adjacent to each other. The irradiation initiation positions and the irradiation completion positions of the respective regions are set to be opposite to each other. The laser lights 9A and 9B are applied with scanning from the irradiation initiation positions in the respective regions to the irradiation completion positions respectively at the same positions as the irradiation initiation position of the other region. The same applies to a case where three or more laser lights are used.

Figure 12:
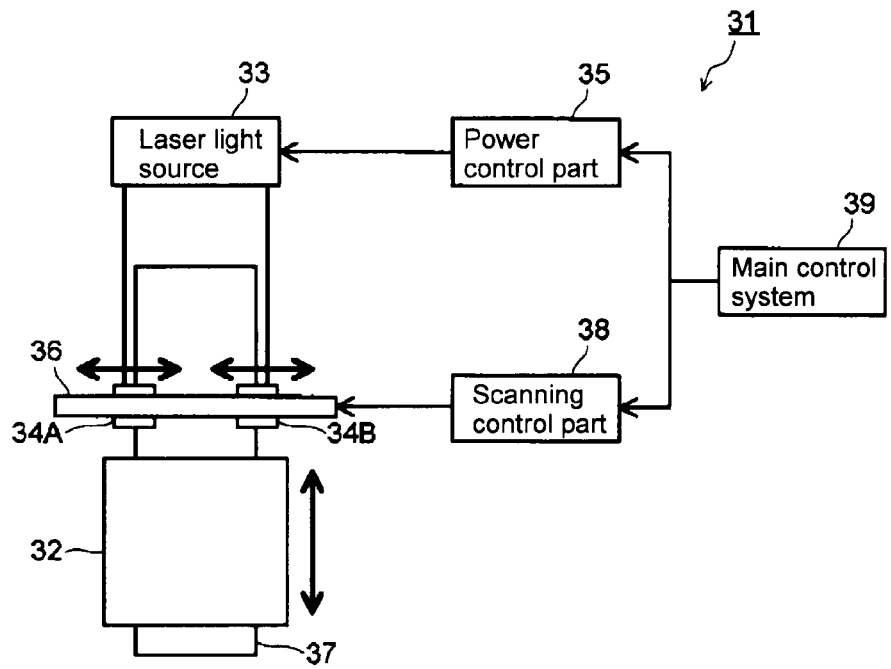
FIG. 12 is a plan view illustrating the apparatus for producing a glass member provided with a sealing material layer according to a second embodiment.
Figure 13:
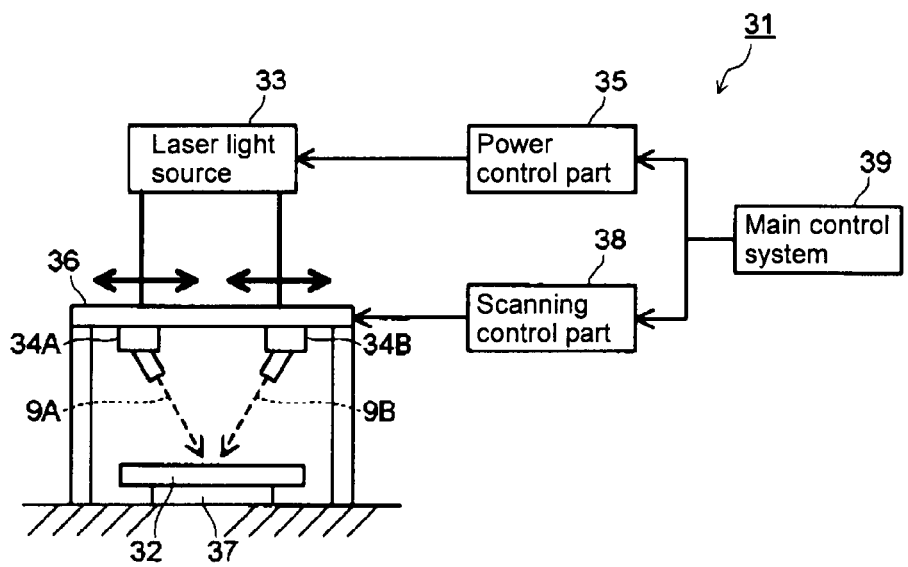
FIG. 13 is a front view illustrating the apparatus for producing a glass member provided with a sealing material layer shown in FIG. 12.

Now, the means (2) will be described. FIGS. 12 and 13 illustrate one example of a laser firing apparatus applicable to the means (2). FIGS. 12 and 13 illustrate an apparatus for producing a glass member provided with a sealing material layer according to a second embodiment. A laser firing apparatus (apparatus for producing a glass member provided with a sealing material layer) 31 shown in these Figs. comprises a sample table 32 on which a glass substrate 2 (not shown in FIGS. 12 and 13) having a frame-form coating layer 8 of a sealing material paste is to be placed, a laser light source 33, and first and second laser irradiation heads (a pair of laser irradiation heads) 34A and 34B to irradiate the coating layer 8 with laser lights emitted from the laser light source 33.

Although not shown in these Figs., each of the first and second laser irradiation heads 34A and 34B has an optical system which focuses a laser light emitted from the laser light source 33, shapes it into a predetermined irradiation spot and applies it to the coating layer 8. The optical system will be described in detail hereinafter. The laser lights emitted from the laser light source 33 are transmitted to the first and second laser irradiation heads 34A and 34B via a branching filter not shown in these Figs. Further, laser light sources 33 in accordance with the number of the laser irradiation heads 34A and 34B may be used.

The powers of the laser lights emitted from the laser light source 33 are controlled by a power control part 35.

The power control part 35 controls the powers of the laser lights by controlling the electric power to be input to the laser light source 33 for example. Further, the power control part 35 may have a power modulator which controls the powers of the laser lights emitted from the laser light source 33. The powers of the laser lights may separately be controlled depending on the first and second laser irradiation heads 34A and 34B.

The first and second laser irradiation heads 34A and 34B are capable of moving in an X-direction by an X stage 36. The sample table 32 is capable of moving in a Y-direction by a Y stage 37. The positional relation between the first and second laser irradiation heads 34A and 34B and the sample table 32 is capable of relatively changing by the X stage 36 and the Y stage 37. The X stage 36 and the Y stage 37 constitute a moving mechanism.

The first and second laser irradiation heads 34A and 34B are respectively placed on the X stage 36. The X stage 36 is fixed above the sample table 32 so that the first and second laser irradiation heads 34A and 34B move to a direction perpendicular to the moving direction of the Y stage 37. The first and second laser irradiation heads 34A and 34B may be placed on and beneath the glass substrate 2. The X stage 36 and the Y stage 37 are controlled by a scanning control part 38. The first and second laser irradiation heads 34A and 34B are placed in an oblique direction, not in a vertical direction, so that the laser lights 9A and 9B emitted therefrom and applied to the frame-form coating layer 8 are on the same position on the frame-form coating layer 8. The first and second laser irradiation heads 34A and 34B are inclined in the X-direction.

Figure 14:
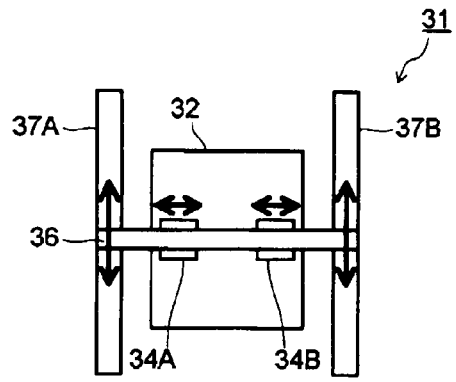
FIG. 14 is a plan view illustrating a modified example of the apparatus for producing a glass member provided with a sealing material layer shown in FIG. 12.
Figure 15:
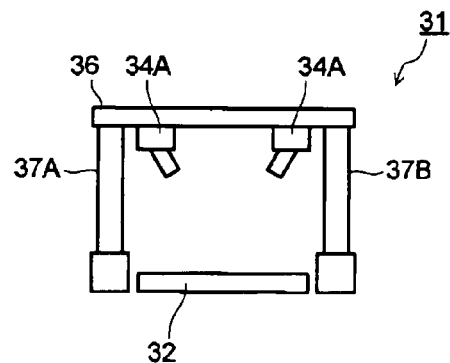
FIG. 15 is a front view illustrating the apparatus for producing a glass member provided with a sealing material layer shown in FIG. 14.

FIGS. 12 and 13 illustrate a constitution such that the sample table 32 is moved by the Y stage 37, but the constitution of the moving mechanism is not limited thereto. FIGS. 14 and 15 illustrate a constitution such that an X stage 36 disposed above a fixed sample table 32 is moved in a Y-direction by two Y stages 37A and 37B. In such a manner, the moving mechanism may have a constitution such that the X stage 36 which moves the first and second laser irradiation heads 34A and 34B in an X-direction is moved in a Y-direction by the two Y stages 37A and 37B.

Figure 16:
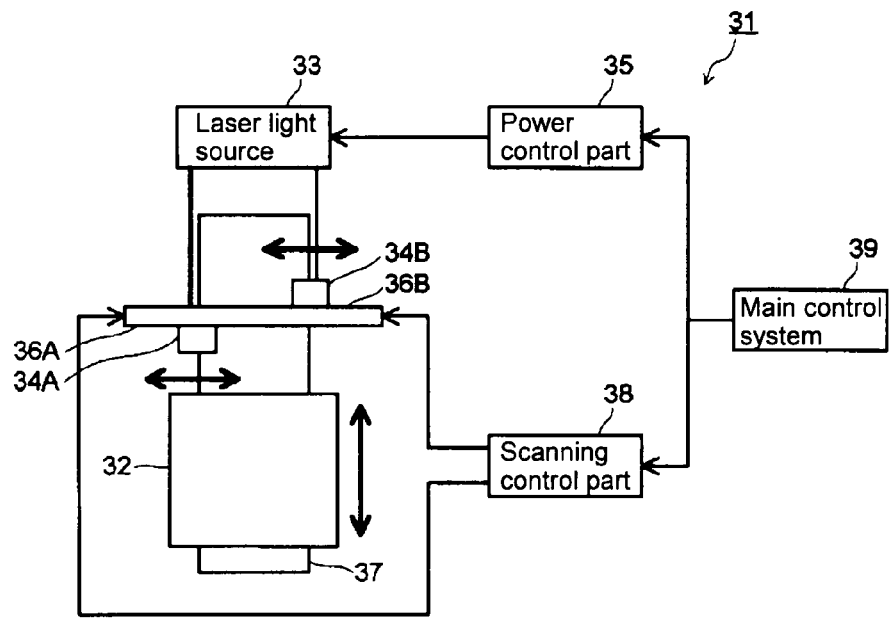
FIG. 16 is a plan view illustrating another modified example of the apparatus for producing a glass member provided with a sealing material layer shown in FIG. 12.
Figure 17:
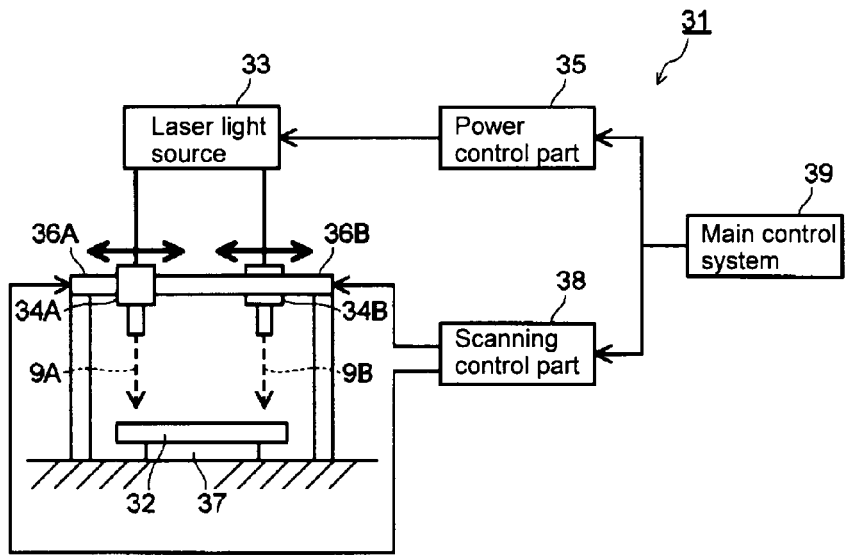
FIG. 17 is a front view illustrating the apparatus for producing a glass member provided with a sealing material layer shown in FIG. 16.
Figure 18:
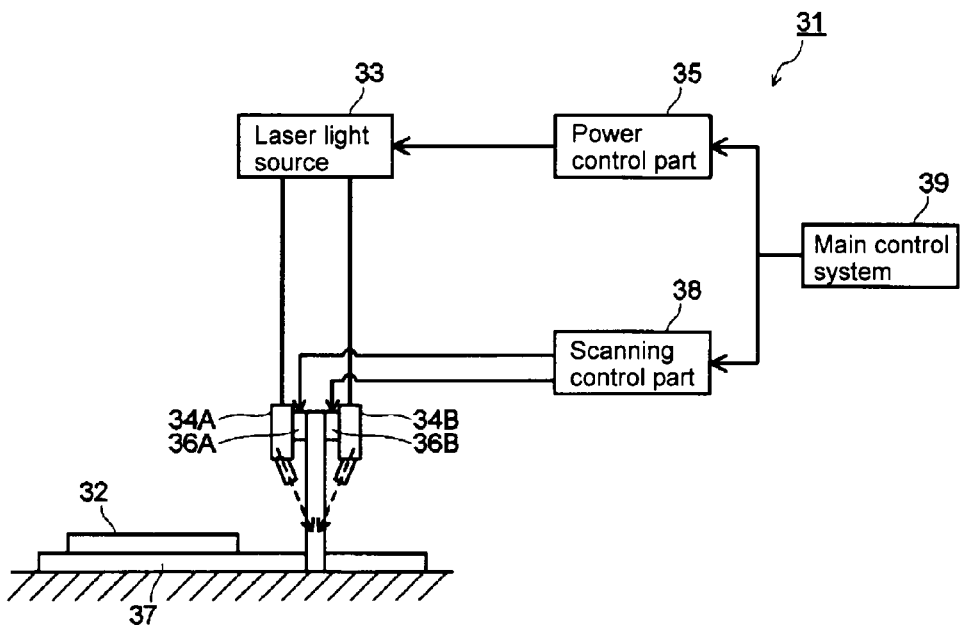
FIG. 18 is a side view illustrating the apparatus for producing a glass member provided with a sealing material layer shown in FIG. 16.

The first and second laser irradiation heads 34A and 34B may be placed on two X stages 36A and 36B as shown in FIGS. 16, 17 and 18. The first and second X stages 36A and 36B are disposed in parallel with the X-direction. In this case, the first and second laser irradiation heads 34A and 34B are inclined in a direction perpendicular to the X-direction. In either constitution, it is possible that the laser lights 9A and 9B are on the same position at the irradiation initiation position and at the irradiation composition position and that they are applied with scanning along the frame-form coating layer 8.

The laser firing apparatus 31 comprises a main control system 39 which comprehensively controls the power control part 35 and the scanning control part 38. Further, the laser firing apparatus 31 comprises a radiation thermometer (not shown) to measure the firing temperature (heating temperature) of the frame-form coating layer 8. The laser firing apparatus 31 preferably comprises a suction nozzle, a blast nozzle or the like to prevent the organic binder burnt out from the frame-form coating layer 8 from being attached to the optical system or the glass substrate 2.

The scanning control part 38 controls the X stage 36 and the Y stage 37 (moving mechanism) so that at least one of the first and second laser light 9A and 9B is applied along the frame-form coating layer 8 with scanning from the irradiation initiation position to the irradiation completion position where the laser lights are on the same position. In a case where only one of the first and second laser lights 9A and 9B is applied with scanning, the other laser irradiation head is fixed so as to constantly irradiate the irradiation initiation position. Otherwise, such a constitution is possible that the irradiation initiation position is constantly irradiated with one of the laser lights by controlling the operation of the X stage and the direction of irradiation with the laser light by the laser irradiation head.

In the means (2), first, the first laser light 9A and the second laser light 9B are applied so that they are on the same position on the irradiation initiation position of the frame-form coating layer 8 of the sealing material paste. Then, at least one of the first laser light 9A and the second laser light 9B is applied with scanning along the frame-form coating layer 8 of the sealing material paste. Then, the first laser light 9A and the second laser light 9B are made to be on the same position on the irradiation completion position of the frame-form coating layer 8 of the sealing material paste and irradiation with the laser lights 9A and 9B is completed in such a state.

As described above, it is considered that the gap is formed at the irradiation completion position by shrinkage of the sealing glass at the completion of the irradiation with the laser light. To solve such a problem, by simultaneously applying the first laser light 9A and the second laser light 9B to the irradiation initiation position and to the irradiation completion position, the sealing glass in a state where it is heated and melted and thus flows is fused. Accordingly, formation of the gap due to a break of the sealing glass can be suppressed. In such a case, the heating temperature of the coating layer 8 is preferably within a range of at least (T+213° C.) and at most (T+480° C.) relative to the softening temperature T (° C.) of the sealing glass including a portion where the first laser light 9A and the second laser light 9B are on the same position.

If the temperature of the coating layer 8 when irradiated with the first and second laser lights 9A and 9B exceeds (T+480° C.), cracks, fractures and the like are likely to form on the glass substrate 2 or the sealing material layer (fired layer) 7. If the temperature of the coating layer 8 when irradiated with the first and second laser lights 9A and 9B is less than (T+213° C.), the entire coating layer 8 cannot uniformly be melted. The heating temperatures at the portion irradiated with the first and second laser lights 9A and 9B simultaneously and at the portion irradiated with only one of them may be the same, or the powers of the laser lights 9A and 9B may be controlled so that the heating temperature at the simultaneously irradiated portion is higher within the above range. In such a case, the set temperature is preferably the same as in the means (1). The scanning rates of the laser lights 9A and 9B are as described above.

Figure 19:
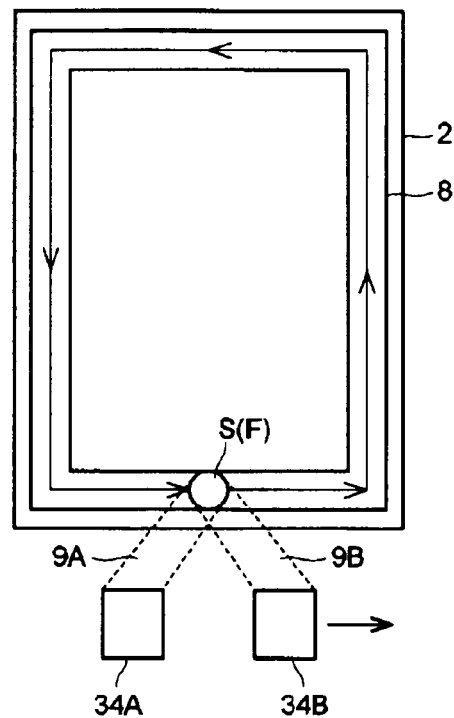
FIG. 19 is a view illustrating a first example of application of a pair of laser lights in the apparatus for producing a glass member provided with a sealing material layer according to a second embodiment.

At least one of the first and second laser lights 9A and 9B is applied with scanning along the frame-form coating layer 8. FIG. 19 illustrates an example wherein the first laser light 9A is constantly applied to the irradiation initiation position S and at the same time, the second laser light 9B is applied with scanning along the frame-form coating layer 8 from the irradiation initiation position S to the irradiation completion position (the same position as the irradiation initiation position) F. First, the first laser light 9A and the second laser light 9B are applied so that they are on the same position at the irradiation initiation position S. The first laser light 9A is constantly applied to the irradiation initiation position S, whereas the second laser light 9B is applied with scanning along the coating layer 8 from the irradiation initiation position S to the irradiation completion position F.

The second laser light 9B is on the same position as the first laser light 9A at the irradiation completion position F (the same position as the irradiation initiation position S). The irradiation initiation position S of the coating layer 8 is constantly irradiated with the first laser light 9A, the sealing glass at the portion is held in a heated and molten state. Accordingly, the sealing glass heated and melted by the second laser light 9B and the sealing glass held in a heated and melted state by the first laser light 9A each in a fluidized state are fused. Accordingly, it is possible to suppress shrinkage of the sealing glass caused by the melted and cooled portion being irradiated with the laser light again, and formation of a gap to be formed by the shrinkage.

Figure 20:
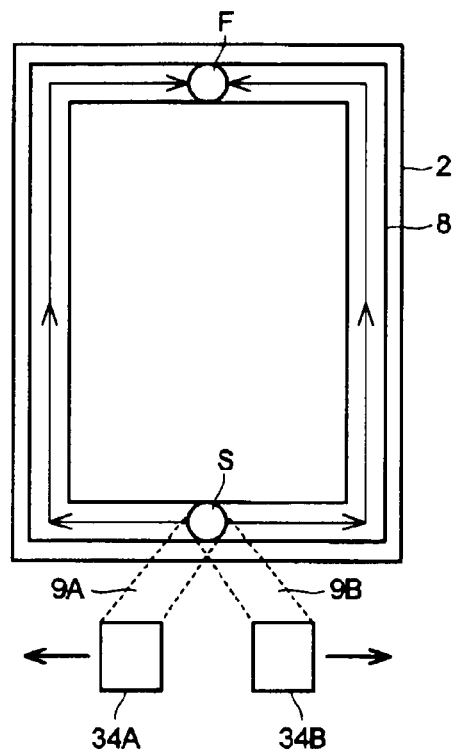
FIG. 20 is a view illustrating a second example of application of a pair of laser lights in the apparatus for producing a glass member provided with a sealing material layer according to a second embodiment.

FIG. 20 illustrates an example wherein the first laser light 9A and the second laser light 9B are applied with scanning from the irradiation initiation position S respectively in opposite directions along the frame-form coating layer 8 to the irradiation completion position F. First, the first laser light 9A and the second laser light 9B are applied so that they are on the same position at the irradiation initiation position S. The first laser light 9A and the second laser light 9B are applied with scanning in opposite directions, and they are independently applied with scanning along the coating layer 8 to the irradiation completion position F. The first laser light 9A and the second laser light 9B meet and are brought to be on the same position at the irradiation completion position F. Accordingly, the sealing glass heated and melted by the first laser light 9A and the sealing glass heated and melted by the second laser light 9B are fused, whereby it is possible to suppress formation of a gap at the irradiation completion position F.

As shown in FIG. 19, when only the second laser light 9B is applied with scanning, the temperature at a portion where the first laser light 9A and the second laser light 9B are on the same position can be controlled to be within a predetermined range by lowering the power density of the first laser light 9A for fixed irradiation to an extent such that the molten state can be maintained. The power density of the second laser light 9B is controlled to be within a range such that it can melt coating layer 8 by itself. In such a case where the second laser light 9B and the first laser light 9A are applied simultaneously also, the power density of the first laser light 9A is controlled so that the temperature at the simultaneously irradiated portion will not exceed the predetermined temperature range. Further, the power density of the second laser light 9B may be controlled so that it is decreased only in the vicinity of the irradiation initiation and in the vicinity of the irradiation completion.

As shown in FIG. 20, in a case where the first and second laser lights 9A and 9B are applied with scanning, their power densities are controlled so that each of them can melt the coating layer 8 by itself. In a case where the portion irradiated with the first laser light 9A and the second laser light 9B simultaneously may exceed the predetermined range, the power density of at least one of the laser lights is controlled to be decreased only in the vicinity of the irradiation initiation and in the vicinity of the irradiation completion. The power densities of the first laser light 9A and the second laser light 9B may be modulated simultaneously, or only one of them may be modulated. In a case where the power densities of the first laser light 9A and the second laser light 9B are modulated, they may be modulated with a time lag.

The laser lights 9A and 9B to be applied to the coating layer 8 of the sealing material paste are not limited to one pair, and a plurality of pairs of laser lights may be used. In such a case, the frame-form coating layer 8 of the sealing material paste is divided into a plurality of regions in accordance with the number of pairs of laser lights. In a case where only one of laser lights is applied with scanning, the irradiation initiation position and the irradiation completion position for each region are set at a portion where the plurality of regions are adjacent to each other. Only one of laser lights of each of the plurality of pairs of laser lights is constantly applied to the irradiation initiation position, and the other laser light is applied with scanning along the frame-form coating layer 8 from the irradiation initiation position to the irradiation completion position in each region. The laser light applied with scanning is brought to be on the same position as the laser light of another pair which is applied to the irradiation initiation position, at the irradiation completion position.

Further, also in a case where both of the laser lights of one pair are applied with scanning, the frame-form coating layer 8 is divided into a plurality of regions in accordance with the number of pairs of laser lights. The irradiation initiation position is set at a center portion of each of the plurality of regions, and the irradiation completion position is set at a portion where the plurality of regions are adjacent to each other. The laser lights of a plurality of pairs are respectively applied to the irradiation initiation position in each of the plurality of regions. The laser lights of each pair are applied from the irradiation initiation position respectively in opposite directions along the frame-form coating layer. The respective laser lights are brought to be on the same position as the laser lights in other pairs at the irradiation completion position.

Figure 21:
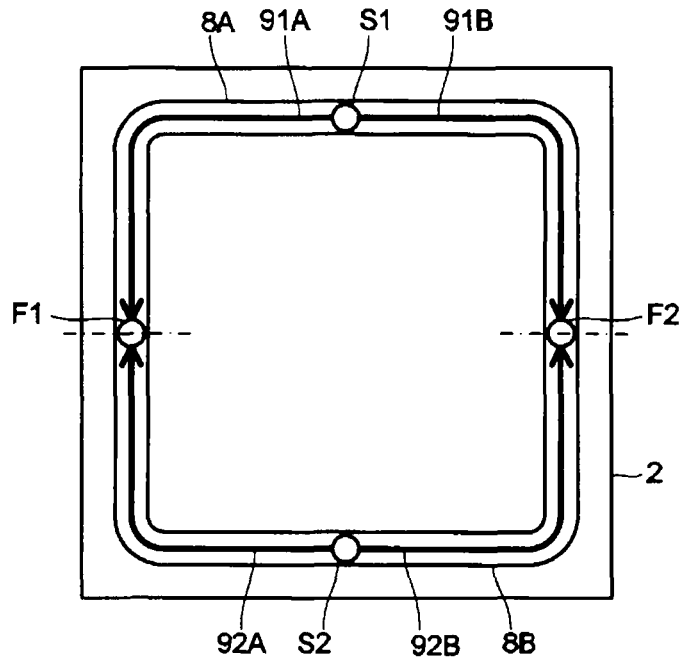
FIG. 21 is a view illustrating another example of application of a laser light in the apparatus for producing a glass member provided with a sealing material layer according to a second embodiment.

FIG. 21 illustrates an example of application wherein two pairs of laser lights (a first pair of laser lights 91A and 91B and a second pair of laser lights 92A and 92B) are used. First, the coating layer 8 is divided into first and second regions 8A and 8B. Irradiation initiation positions S1 and S2 are set at a center portion of each of the regions 8A and 8B, and irradiation completion positions F1 and F2 are set at a portion where the plurality of regions 8A and 8b are adjacent to each other. The irradiation completion position F1 is an irradiation completion position of the first laser light 91A of the first pair and the first laser light 92A of the second pair. The irradiation completion position F2 is the irradiation completion position of the second laser light 91B of the first pair and the second laser light 92B of the second pair.

The laser lights 91A and 91B of the first pair are applied so that they are on the same position at the irradiation initiation position S1, and they are applied with scanning from the irradiation initiation position S1 respectively in opposite directions along the frame-form coating layer 8. The same applies to the laser lights 92A and 92B of the second pair, and they are applied to the irradiation initiation position S2, and then applied with scanning from the irradiation initiation position S2 respectively in opposite directions along the frame-form coating layer 8. And, the first laser light 91A of the first pair and the first laser light 92A of the second pair are on the same position at the irradiation completion position F1. The second layer light 91B of the first pair and the second laser light 92B of the second pair are on the same position at the irradiation completion position F2.

Figure 22:
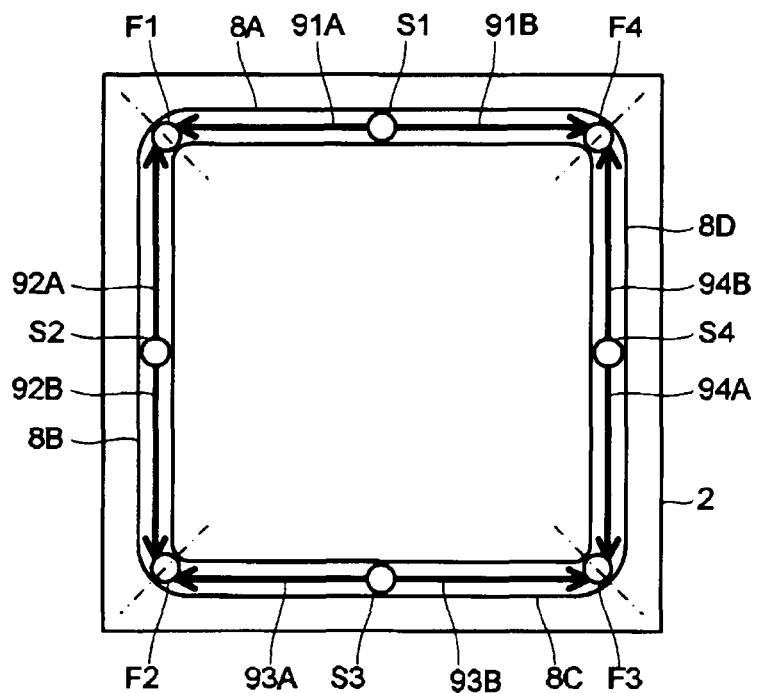
FIG. 22 is a view illustrating still another example of application of a laser light in the apparatus for producing a glass member provided with a sealing material layer according to a second embodiment.

FIG. 22 illustrates an example of application wherein four pairs of laser lights (a first pair of laser lights 91A and 91B, a second pair of laser lights 92A and 92B, a third pair of laser lights 93A and 93B and a fourth pair of laser lights 94A and 94B) are used. When four pairs of laser lights are used, the coating layer 8 is divided into first, second, third and fourth regions 8A, 8B, 8C and 8D. Irradiation initiation positions S1, S2, S3 and S4 are set respectively at a center portion of each of the regions 8A, 8B, 8C and 8D, and irradiation completion positions F1, F2, F3 and F4 are set respectively at a portion where the plurality of regions 8A, 8B, 8C and 8D are adjacent to each other. Application of the respective pairs of laser lights with scanning is conducted in the same manner as in the case of the two pairs of laser lights, and each laser light is brought to be on the same position as the laser light of adjacent pair at the irradiation completion position. By using a plurality of pairs of laser lights in such a manner, the time of firing the frame-form coating layer 8 can be shortened.

Now, the means (3) will be described. In the means (3), a back plate removable from the sealing glass is disposed on the frame-form coating layer 8 of the sealing material paste, and the coating layer 8 is irradiated with the laser light 9 from the glass substrate 2 side in such a state. In a case where the back plate is light-transmitting, the coating layer 8 may be irradiated with the laser light 9 from the back plate side. By disposing the back plate on the coating layer 8 of the sealing material paste, flow of the molten sealing glass will be inhibited by the van der Waals' force, the surface friction or the like caused between them, whereby a gap is less likely to form between the irradiation initiation position and the irradiation completion position with the laser light 9. Accordingly, formation of a gap at the irradiation completion position can be suppressed.

As the back plate, a substrate made of a metal, a semiconductor, a non-oxide ceramic (such as a nitride ceramic or a carbide ceramic) may, for example, be used. Such a substrate has poor wettability to glass and is thereby removable from the sealing glass. Accordingly, even when the coating layer 8 of the sealing material paste is irradiated with the laser light 9 in a state where it is laminated with the back plate, the back plate will not be bonded to the sealing material layer 7. That is, a sound sealing material layer 7 can be obtained.

The above-described second glass substrate 2 having a sealing material layer 7 formed thereon by the step of firing the coating layer 8 of the sealing material paste, and a separately prepared first glass substrate 1 are used to prepare an electronic device such as a FPD such as an OELD, a PDP or a LCD, an illumination apparatus employing an OEL element or a solar cell such as a dye-sensitized solar cell. That is, as shown in FIG. 1(b), a first glass substrate 1 and a second glass substrate 2 are laminated via a sealing material layer 7 so that their surfaces 1a and 2a face each other. Between the first glass substrate 1 and the second glass substrate 2, a space is formed based on the thickness of the sealing material layer 7.

Then, as shown in FIG. 1(c), the sealing material layer 7 is irradiated with a laser light 10 for sealing through the second glass substrate 2. The sealing material layer 7 may be irradiated with the laser light 10 for sealing through the first glass substrate 1. The laser light 10 for sealing is applied with scanning along the frame-form sealing material layer 7. The sealing material layer 7 is sequentially melted from a portion irradiated with the laser light 10, and is quenched and solidified upon completion of irradiation with the laser light 10 and bonded to the first glass substrate 1. By irradiating the sealing material layer 7 with the laser light 10 for sealing over its perimeter, a sealing layer 11 to seal a space between the first glass substrate 1 and the second glass substrate 2 is formed as shown in FIG. 1(d).

In such a manner, an electronic device 12 having an electronic element portion 4 disposed between the first glass substrate 1 and the second glass substrate 2 hermetically sealed in a glass panel comprising the first glass substrate 1, the second glass substrate 2 and the sealing layer 11, is prepared. The glass panel according to such an embodiment is not limited to a member constituting the electronic device 12, and is applicable to a sealed product of an electronic component, or a glass member (e.g. a building material) such as vacuum double-glazing.

According to the procedure for production of the electronic device 12 according to this embodiment, even in a case where an organic resin film, an element film or the like is formed on the surface 2a of the second glass substrate 2, the sealing material layer 7 and the sealing layer 11 can favorably be formed without imparting thermal damage to such a film. Accordingly, an electronic device 12 excellent in the airtightness and the reliability can be prepared with good reproducibility without impairing the function and the reliability of the electronic device 12.

EXAMPLES

Now, the present invention will be described in detail with reference to specific Examples and the evaluation results. However, it should be understood that the present invention is by no means restricted to the following specific Examples, and modification within the scope of the present invention is possible.

Example 1

Bismuth glass frit (softening temperature: 450° C.) having a composition comprising 83.2 mass % of $Bi_2O_3$, 5.6 mass % of $B_2O_3$, 10.7 mass % of ZnO and 0.5 mass % of $Al_2O_3$ and having an average particle size of 1 μm, a cordierite powder having an average particle size of 2 μm as a low-expansion filler, and a laser absorbent having a composition of $Fe_2O_3$—$Cr_2O_3$—$MnO$—$CO_2O_3$ and having an average particle size of 1 μm, were prepared.

72.7 vol % of the bismuth glass frit, 22.0 vol % of the cordierite powder and 5.3 vol % of the laser absorbent were mixed to prepare a sealing material. 80 mass % of the sealing material was mixed with 20 mass % of a vehicle to prepare a sealing material paste. The vehicle is one having ethyl cellulose (2.5 mass %) as a binder component dissolved in a solvent (97.5 mass %) comprising terpineol.

Then, a second glass substrate (dimensions: 90×90×0.7 mmt) comprising alkali-free glass (thermal expansion coefficient: $38×10^{-7}/°C$.) was prepared, and the sealing material paste was applied to a sealing region of the glass substrate by a screen printing method and dried at 120° C. for 10 minutes. The sealing material paste was applied so that the thickness would be 20 μm and the line width would be 1 mm after drying. On the surface of the second glass substrate, a color filter made of a resin was formed, and it is necessary to form a sealing layer on the sealing region of the second glass substrate without imparting thermal damage to the color filter.

Then, the alkali-free glass substrate having a coating layer of the sealing material paste formed thereon was disposed on a sample holder of a laser irradiation apparatus by means of an alumina substrate having a thickness of 0.5 mm, and the coating layer of the sealing material paste was irradiated with a laser light (semiconductor laser) having a wavelength of 940 nm, a spot diameter of 1.6 mm and a power density of 249 $W/cm^2$ at a scanning rate of 0.5 mm/sec. The heating temperature of the coating layer when irradiated with the laser light was measured by a radiation thermometer, whereupon the temperature of the coating layer was 600° C.

By firing the coating layer of the sealing material paste by irradiation with a laser light under such conditions, a sealing material layer having a thickness of 12 μm was formed. The state of the sealing material layer was observed by a SEM, whereupon favorable vitrification was confirmed. No air bubbles nor formation of the surface deformation caused by the organic binder was confirmed in the sealing material layer. The carbon amount remaining in the sealing material layer was measured, whereupon it was confirmed to be the same level as the remaining carbon amount when a coating layer of the same sealing material paste was fired in an electric furnace (at 250° C. for 40 minutes). Further, it was confirmed that no thermal damage or the like was imparted to the color filter formed on the surface of the glass substrate.

The step of firing the coating layer of the sealing material paste with a laser light was carried out by changing the power density of the laser light to 348 $W/cm^2$ and 448 $W/cm^2$, whereupon favorably vitrified sealing material layers were obtained under the respective conditions. The temperatures of the coating layers were 673° C. and 871° C. Further, the firing step was carried out at a lowered power of the laser light, whereupon only the surface of the coating layer was vitrified. In this case, the power density of the laser light was 199 $W/cm^2$, and the temperature of the coating layer was 491° C. When a laser light with an elevated power was applied, cracks formed in the glass substrate and the sealing material layer. In this case, the power density of the laser light was 497 $W/cm^{2¹}$ and the temperature of the coating layer was 965° C.

From these results, it is found that the heating temperature of the coating layer is preferably within a range of from 600 to 900° C. when the scanning rate of the laser light is 0.5 mm/sec. This heating temperature of the coating layer corresponds to a range of +150° C. to +450° C. relative to the softening temperature (450° C.) of the sealing glass.

Then, the above second glass substrate having the sealing material layer and a first glass substrate (a substrate comprising alkali-free glass having the same composition and the same shape as the second glass substrate) having an element region (a region having an OEL element formed thereon) were laminated. Then, the sealing material layer was irradiated with a laser light (semiconductor laser) having a wavelength of 940 nm, a power of 60 W and a spot diameter of 1.6 mm at a scanning rate of 10 mm/s through the second glass substrate, and the sealing material layer was melted, and quenched and solidified to seal the first glass substrate and the second glass substrate.

With respect to the outer appearance of the glass panel thus prepared, cracks and fractures of the glass substrate or the sealing layer, the bonding state of the sealing layer, etc., were observed by an optical microscope and evaluated, whereupon favorable results with respect to each point were confirmed. The airtightness of the glass panel was measured by helium leak test, whereupon a favorable airtightness state was confirmed. Further, the bond strength between each glass substrate and the sealing layer was measured, whereupon it was confirmed to be at the same level as that of a glass panel prepared by employing the above sealing layer fired in the electric furnace.

Example 2

A step of firing the coating layer of the sealing material paste was carried out in the same manner as in Example 1 except that the power density of the laser light to be applied to the coating layer of the sealing material paste was changed to 298 $W/cm^2$, and the scanning rate was changed to 1 mm/sec. In this step, the temperature of the coating layer was 637° C. By firing the coating layer of the sealing material paste by irradiation with a laser light under such conditions, a sealing material layer having a thickness of 12 μm was formed. The state of the sealing material layer was observed by a SEM, whereupon favorable vitrification was confirmed. No air bubbles nor formation of the surface deformation caused by the organic binder was confirmed in the sealing material layer. The carbon amount remaining in the sealing material layer was measured, whereupon it was confirmed to be the same level as the remaining carbon amount when a coating layer of the same sealing material paste was fired in an electric furnace (at 250° C. for 40 minutes).

The step of firing the coating layer of the sealing material paste with a laser light was carried out by changing the power density of the laser light to 398 $W/cm^2$ and 497 $W/cm^2$, whereupon favorably vitrified sealing material layers were obtained under the respective conditions. The temperatures of the coating layers were 768° C. and 887° C. Further, the firing step was carried out at a lowered power of the laser light, whereupon only the surface of the coating layer was vitrified. In this case, the power density of the laser light was 249 $W/cm^2$, and the temperature of the coating layer was 560° C. When a laser light with an elevated power was applied, cracks formed in the glass substrate and the sealing material layer. In this case, the power density of the laser light was 547 $W/cm^{2¹}$ and the temperature of the coating layer was 955° C.

From these results, it is found that the heating temperature of the coating layer is preferably within a range of from 630 to 900° C. when the scanning rate of the laser light is 1 mm/sec. This heating temperature of the coating layer corresponds to a range of +180° C. to +450° C. relative to the softening temperature (450° C.) of the sealing glass.

Then, in the same manner as in Example 1, the second glass substrate having the sealing material layer and a first glass substrate having an element region were laminated, and then the sealing material layer was irradiated with a laser light through the second glass substrate to seal the first glass substrate and the second glass substrate. The first and second glass substrates comprise alkali-free glass in the same manner as in Example 1. The obtained glass panel was excellent in the outer appearance, the airtightness, the bond strength, etc. in the same manner as in Example 1.

Example 3

A step of firing the coating layer of the sealing material paste was carried out in the same manner as in Example 1 except that the power density of the laser light to be applied to the coating layer of the sealing material paste was changed to 448 W/cm$^2$, and the scanning rate was changed to 3 mm/sec. In this step, the temperature of the coating layer was 666° C. By firing the coating layer of the sealing material paste by irradiation with a laser light under such conditions, a sealing material layer having a thickness of 12 μm was formed. The state of the sealing material layer was observed by a SEM, whereupon favorable vitrification was confirmed. No air bubbles nor formation of the surface deformation caused by the organic binder was confirmed in the sealing material layer. The carbon amount remaining in the sealing material layer was measured, whereupon it was confirmed to be the same level as the remaining carbon amount when a coating layer of the same sealing material paste was fired in an electric furnace (at 250° C. for 40 minutes).

The step of firing the coating layer of the sealing material paste with a laser light was carried out by changing the power density of the laser light to 647 W/cm$^2$ and 746 W/cm$^2$, whereupon favorably vitrified sealing material layers were obtained under the respective conditions. The temperatures of the coating layers were 790° C. and 897° C. Further, the firing step was carried out at a lowered power of the laser light, whereupon only the surface of the coating layer was vitrified. In this case, the power density of the laser light was 398 W/cm$^2$, and the temperature of the coating layer was 646° C. When a laser light with an elevated power was applied, cracks formed in the glass substrate and the sealing material layer. In this case, the power density of the laser light was 846 W/cm$^{2'}$ and the temperature of the coating layer was 1,044° C.

From these results, it is found that the heating temperature of the coating layer is preferably within a range of from 660 to 900° C. when the scanning rate of the laser light is 3 mm/sec. This heating temperature of the coating layer corresponds to a range of +210° C. to +450° C. relative to the softening temperature (450° C.) of the sealing glass.

Then, in the same manner as in Example 1, the second glass substrate having the sealing material layer and a first glass substrate having an element region were laminated, and then the sealing material layer was irradiated with a laser light through the second glass substrate to seal the first glass substrate and the second glass substrate. The first and second glass substrates comprise alkali-free glass in the same manner as in Example 1. The obtained glass panel was excellent in the outer appearance, the airtightness, the bond strength, etc. in the same manner as in Example 1.

Example 4

A step of firing the coating layer of the sealing material paste was carried out in the same manner as in Example 1 except that the power density of the laser light to be applied to the coating layer of the sealing material paste was changed to 497 W/cm$^2$, and the scanning rate was changed to 5 mm/sec. In this step, the temperature of the coating layer was 663° C. By firing the coating layer of the sealing material paste by irradiation with a laser light under such conditions, a sealing material layer having a thickness of 12 μm was formed. The state of the sealing material layer was observed by a SEM, whereupon favorable vitrification was confirmed. No air bubbles nor formation of the surface deformation caused by the organic binder was confirmed in the sealing material layer. The carbon amount remaining in the sealing material layer was measured, whereupon it was confirmed to be the same level as the remaining carbon amount when a coating layer of the same sealing material paste was fired in an electric furnace (at 250° C. for 40 minutes).

The step of firing the coating layer of the sealing material paste with a laser light was carried out by changing the power density of the laser light to 746 W/cm$^2$ and 846 W/cm$^2$, whereupon favorably vitrified sealing material layers were obtained under the respective conditions. The temperatures of the coating layers were 803° C. and 858° C. Further, the firing step was carried out at a lowered power of the laser light, whereupon only the surface of the coating layer was vitrified. In this case, the power density of the laser light was 448 W/cm$^2$, and the temperature of the coating layer was 631° C. When a laser light with an elevated power was applied, cracks formed in the glass substrate and the sealing material layer. In this case, the power density of the laser light was 995 W/cm$^{2'}$ and the temperature of the coating layer was 1,043° C.

From these results, it is found that the heating temperature of the coating layer is preferably within a range of from 680 to 900° C. when the scanning rate of the laser light is 5 mm/sec. This heating temperature of the coating layer corresponds to a range of +230° C. to +450° C. relative to the softening temperature (450° C.) of the sealing glass.

Then, in the same manner as in Example 1, the second glass substrate having the sealing material layer and a first glass substrate having an element region were laminated, and then the sealing material layer was irradiated with a laser light through the second glass substrate to seal the first glass substrate and the second glass substrate. The first and second glass substrates comprise alkali-free glass in the same manner as in Example 1. The obtained glass panel was excellent in the outer appearance, the airtightness, the bond strength, etc. in the same manner as in Example 1.

Reference Example

The step of firing the coating layer of the sealing material paste was carried out in the same manner as in Example 1 except that the power density of the laser light to be applied to the coating layer of the sealing material paste was changed to 696 W/cm$^2$ and the scanning rate to 10 mm/sec. A sealing material layer having a thickness of 12 μm was formed by firing the coating layer of the sealing material paste by irradiation with a laser light under such conditions.

The state of the obtained sealing material layer was observed by a SEM, whereupon although vitrification was confirmed, deformation due to air bubbles derived from the organic binder was confirmed on the surface, and remaining of air bubbles was confirmed in the interior. Using such a sealing material layer, a step of laser sealing the first glass substrate and the second glass substrate was carried out, whereupon no favorable sealing state nor airtightness was obtained. Substantially the same results were obtained in a case where the scanning rate of the laser light applied to the coating layer of the sealing material paste was 7 mm/sec.

Example 5

In the same manner as in Example 1, a coating layer of the sealing material paste was formed on the alkali-free glass substrate (first glass substrate). The glass substrate was disposed on the same sample holder of the laser irradiation apparatus as in Example 1 via an alumina substrate having a thickness of 0.5 mm. Then, the coating layer of the sealing material paste was irradiated with a first laser light having a wavelength of 808 nm and a power density of 194 W/cm$^2$ at a fixed point, and at the same time, the same position was irradiated with a second laser light having a wavelength of 940 nm and a power density of 298 W/cm$^2$, and further the second laser light was applied along the coating layer at a scanning rate of 1 mm/sec. The irradiation with the second laser light was completed when the second laser light was on the same position as the first laser light.

The first laser light is such that the heating temperature of the coating layer at the time of fixed irradiation becomes 637° C. The second laser light is such that the heating temperature of the coating layer when irradiated at a scanning rate of 1 mm/sec becomes 637° C. The heating temperature of the coating layer when simultaneously irradiated is 910° C. By firing the coating layer of the sealing material paste by using such two laser lights, a sealing material layer having a thickness of 12 μm was formed. The state of the sealing material layer was observed by a SEM, whereupon favorable vitrification was confirmed. Further, no formation of a gap at the irradiation completion position was confirmed.

Then, in the same manner as in Example 1, the second glass substrate having the sealing material layer and a first glass substrate having an element region were laminated, and the sealing material layer was irradiated with a laser light through the second glass substrate to seal the first glass substrate and the second glass substrate. The obtained glass panel was excellent in the outer appearance, the airtightness, the bond strength, etc. in the same manner as in Example 1.

Example 6

In the same manner as in Example 1, a coating layer of the sealing material paste was formed on the alkali-free glass substrate (first glass substrate). The glass substrate was disposed on the same sample holder of the laser irradiation apparatus as in Example 1 via an alumina substrate having a thickness of 0.5 mm. Then, the coating layer of the sealing material paste was irradiated with a first laser light having a wavelength of 808 nm and a power density of 199 W/cm$^2$ at a fixed point, and at the same time, the same position was irradiated with a second laser light having a wavelength of 940 nm and a power density of 448 W/cm$^2$, and further the second laser light was applied along the coating layer at a scanning rate of 3 mm/sec. The irradiation with the second laser light was completed when the second laser light was on the same position as the first laser light.

The first laser light is such that the heating temperature of the coating layer at the time of fixed irradiation becomes 680° C. The second laser light is such that the heating temperature of the coating layer when irradiated at a scanning rate of 3 mm/sec becomes 680° C. The heating temperature of the coating layer when simultaneously irradiated is 930° C. By firing the coating layer of the sealing material paste by using such two laser lights, a sealing material layer having a thickness of 12 μm was formed. The state of the sealing material layer was observed by a SEM, whereupon favorable vitrification was confirmed. Further, no formation of a gap at the irradiation completion position was confirmed.

Then, in the same manner as in Example 1, the second glass substrate having the sealing material layer and a first glass substrate having an element region were laminated, and the sealing material layer was irradiated with a laser light through the second glass substrate to seal the first glass substrate and the second glass substrate. The obtained glass panel was excellent in the outer appearance, the airtightness, the bond strength, etc. in the same manner as in Example 1.

Example 7

In the same manner as in Example 1, a coating layer of the sealing material paste was formed on the alkali-free glass substrate (first glass substrate). The glass substrate was disposed on the same sample holder of the laser irradiation apparatus as in Example 1 via an alumina substrate having a thickness of 0.5 mm. Then, the coating layer of the sealing material paste was irradiated with a first laser light having a wavelength of 808 nm and a power density of 224 W/cm$^2$ at a fixed point, and at the same time, the same position was irradiated with a second laser light having a wavelength of 940 nm and a power density of 497 W/cm$^2$, and further the second laser light was applied along the coating layer at a scanning rate of 5 mm/sec. The irradiation with the second laser light was completed when the second laser light was on the same position as the first laser light.

The first laser light is such that the heating temperature of the coating layer at the time of fixed irradiation becomes 700° C. The second laser light is such that the heating temperature of the coating layer when irradiated at a scanning rate of 5 mm/sec becomes 663° C. The heating temperature of the coating layer when simultaneously irradiated is 930° C. By firing the coating layer of the sealing material paste by using such two laser lights, the sealing material layer having a thickness of 12 μm was formed. The state of the sealing material layer was observed by a SEM, whereupon favorable vitrification was confirmed. Further, no formation of a gap at the irradiation completion position was confirmed.

Then, in the same manner as in Example 1, the second glass substrate having the sealing material layer and a first glass substrate having an element region were laminated, and the sealing material layer was irradiated with a laser light through the second glass substrate to seal the first glass substrate and the second glass substrate. The obtained glass panel was excellent in the outer appearance, the airtightness, the bond strength, etc. in the same manner as in Example 1.

Example 8

In the same manner as in Example 1, a coating layer of the sealing material paste was formed on an alkali-free glass substrate (first glass substrate). The glass substrate was disposed on the same sample holder of the laser irradiation apparatus as in Example 1 via an alumina substrate having a thickness of 0.5 mm. Then, the coating layer of the sealing material paste was irradiated with a laser light having a wavelength of 940 nm and a power density of 597 W/cm$^2$ at a scanning rate of 1 mm/sec for 3 seconds, and then the coating layer was irradiated with a laser light having a lowered power density of 348 W/cm$^2$ at the same scanning rate along the coating layer. Then, 3 seconds before the laser light reached the irradiation completion position (the same position as the irradiation initiation position), the power density of the laser light was raised again to 597 W/cm$^2$, and the coating layer was irradiated in such a state to the irradiation completion position.

The heating temperature of the coating layer when the power density of the laser light was 597 W/cm$^2$ is 1,000° C. The heating temperature of the coating layer when the power density of the laser light is 348 W/cm$^2$ is 700° C. By firing the coating layer of the sealing material paste by using such a laser light having the power modulated, a sealing material layer having a thickness of 12 μm was formed. The state of the sealing material layer was observed by a SEM, whereupon favorable vitrification was confirmed. Further, no formation of a gap at the irradiation completion position was confirmed.

Then, in the same manner as in Example 1, the second glass substrate having the sealing material layer and a first glass substrate having an element region were laminated, and then the sealing material layer was irradiated with a laser light through the second glass substrate to seal the first glass substrate and the second glass substrate. The obtained glass panel was excellent in the outer appearance, the airtightness, the bond strength, etc. in the same manner as in Example 1.

Example 9

In the same manner as in Example 1, a coating layer of the sealing material paste was formed on an alkali-free glass substrate (first glass substrate). On the same sample holder of the laser irradiation apparatus as in Example 1, a silicon substrate having a thickness of 0.5 mm was disposed instead of the alumina substrate having a thickness of 0.5 mm, and the glass substrate was placed on the silicon substrate so that the coating layer of the sealing material paste was in contact with the silicon substrate. Then, the coating layer of the sealing material paste was irradiated with a laser light having a wavelength of 940 nm and a power density of 896 W/cm$^2$ from the glass substrate side at a scanning rate of 1 mm/sec along the coating layer. The heating temperature of the coating layer by the laser light is 860° C.

The state of the sealing material layer thus formed was observed by a SEM, whereupon favorable vitrification was confirmed. Further, no formation of a gap at the irradiation completion position was confirmed. Further, in the same manner as in Example 1, the second glass substrate having the sealing material layer and a first glass substrate having an element region were laminated, and then the sealing material layer was irradiated with a laser light through the second glass substrate to seal the first glass substrate and the second glass substrate, and the obtained glass panel was excellent in the outer appearance, the airtightness, the bond strength, etc.

Example 10

An Example in which a coating layer of a sealing material paste is fired by using a laser firing apparatus 31 shown in FIGS. 12 and 13 will be described. As a laser light source 33, for example, a semiconductor laser (manufactured by LIMO) having a wavelength of 808 nm and a maximum oscillation power of 80 W is used. As the X stage 36, SGSP33-100 (X) manufactured by SIGMA KOKI CO., LTD. (maximum move amount: 100 mm, positioning accuracy: 20 μm) is used. As the Y stage 37, SGSP33-200 (X) (maximum move amount: 200 mm, positioning accuracy: 20 μm) is used.

Figure 23:
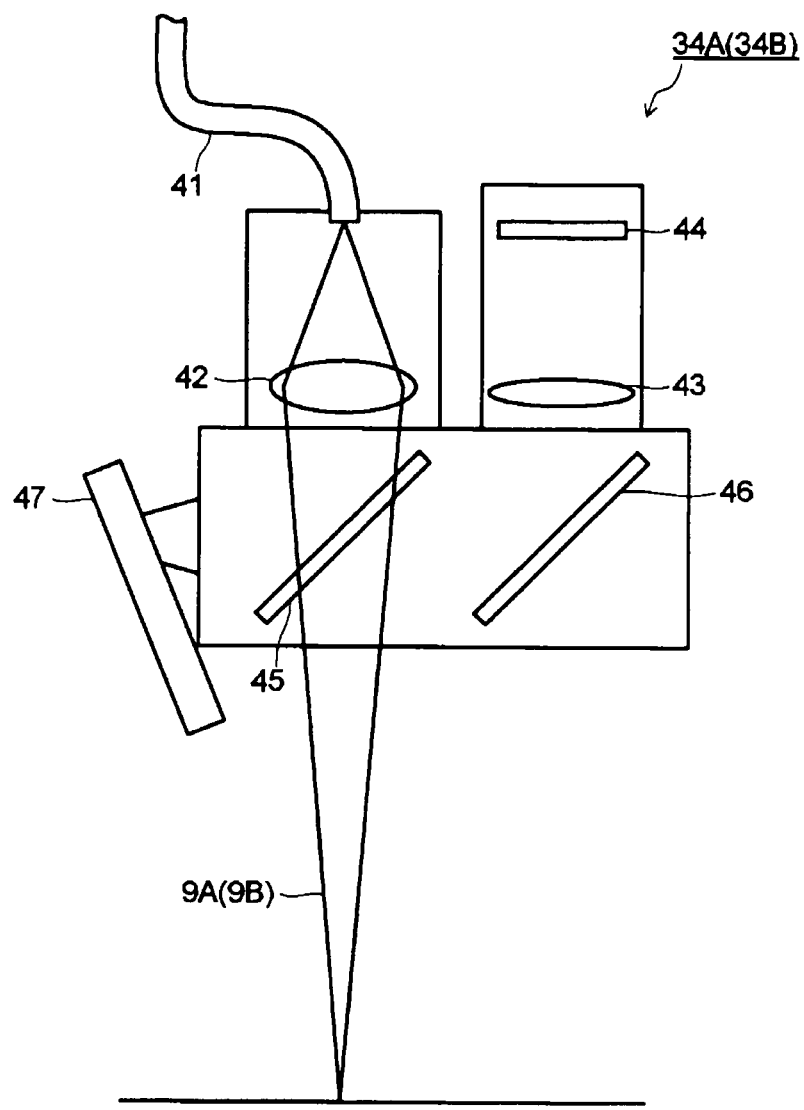
FIG. 23 is a view illustrating the structure of a laser irradiation head in the apparatus for producing a glass member provided with a sealing material layer according to the embodiment.

Each of laser irradiation heads 34A and 34B comprises, for example, as shown in FIG. 23, an optical fiber (core diameter: 400 μm, NA: 0.22) 41 which transmits the laser light emitted from the laser light source 33, a condenser lens (focal length: 100 mm) 42 which condenses the laser light and shapes it into a desired irradiation spot, an imaging lens 43 and a CCD imaging element (350,000 pixels) 44 to observe the portions irradiated with the laser lights 9A and 9B, a dichroic mirror 45 which reflects only the visible light ray from the portions irradiated with the laser lights 9A and 9B (which transmits the laser light) and guides it to the CCD imaging element 44, and a reflecting mirror 46. Further, a two-color radiation thermometer (manufactured by CHINO CORPORATION, IR-FA) 47 which measures the temperature of the portions irradiated with the laser lights 9A and 9B is installed.

Figure 24:
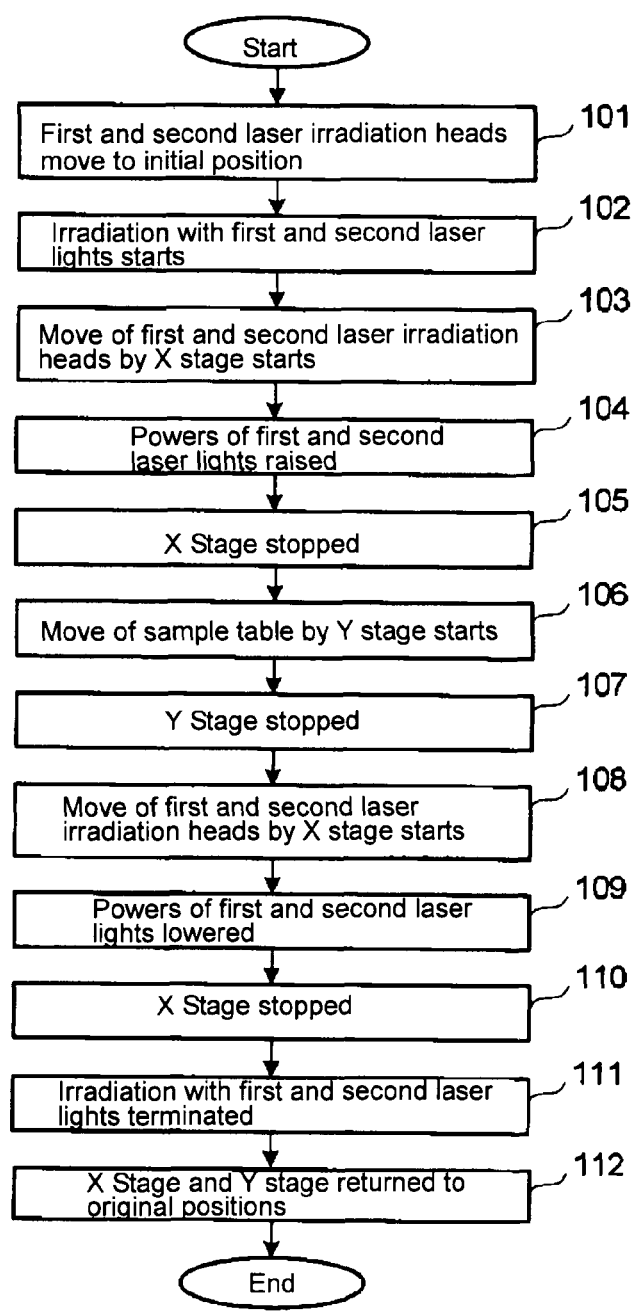
FIG. 24 is a flow chart illustrating a process for forming a sealing material layer by the apparatus for producing a glass member provided with a sealing material layer according to a second embodiment.
Figure 25:
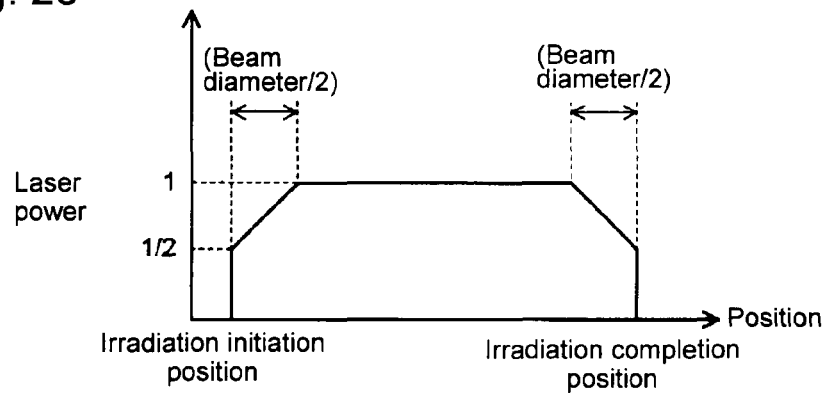
FIG. 25 is a view illustrating an example to control the power of a laser light in the apparatus for producing a glass member provided with a sealing material layer according to a second embodiment.

FIG. 24 is a flow chart illustrating a process for forming a sealing material layer by the laser firing apparatus 31 (a process of firing the frame-form coating layer of the sealing material paste). FIG. 25 illustrates an example to control the power of a laser light in the process. The process of firing the frame-form coating layer will be described based on these Figs. As a preparation stage, in the same procedure as in Example 1, an alkali-free glass substrate having a frame-form coating layer of the sealing material paste formed thereon is prepared. The glass substrate is disposed on the sample table 32 of the laser firing apparatus 31 via an alumina substrate having a thickness of 0.5 mm. The glass substrate is disposed so that the frame-form coating layer faces upward.

First, the first and second irradiation heads 34A and 34B move to the initial position (101), and the first and second laser lights 9A and 9B are applied to the same point of the frame-form coating layer each with a spot diameter of 1.6 mm and a power density of 400 W/cm$^2$ (102). In this Example, the irradiation initiation position (the same point) of the laser lights 9A and 9B is a center point of one side of the frame-form coating layer. The temperature of the frame-form coating layer at that time is 860° C.

Then, the X stage 36 is operated to make the first and second laser irradiation heads 34A and 34B move so that the first and second laser lights 9A and 9B move apart from each other at a scanning rate of 5 mm/sec on the frame-form coating layer 8 (103). When each of the first and second laser lights 9A and 9B move 0.8 mm (½ of the spot diameter) from the irradiation initiation position, the powers of the first and second laser lights 9A and 9B are respectively raised to 750 W/cm$^2$ and such laser lights are applied (104). The temperatures of the respective irradiated portions of the coating layer are 800° C.

When the first and second laser lights 9A and 9B reach the corners of the frame-form coating layer, the operation of the X stage 36 is stopped (105), and instead, the Y stage 37 is operated to make the sample table 32 move at a rate of 5 mm/sec (106). At this time also, the powers of the laser lights 9A and 9B are 750 W/cm$^2$, and the temperatures of the respective irradiated portions of the coating layer are 800° C. When the first and second laser lights 9A and 9B reach the corners of the frame-form coating layer, the operation of the Y stage 37 is stopped (107), and then the X stage 36 is operated to make the first and second laser irradiation heads 34A and 34B move so that the first and second laser lights 9A and 9B come close to each other each at a rate of 5 mm/sec (108). At this time also, the powers of the laser lights 9A and 9B are 750 W/cm$^2$, and the temperatures of the respective portions of the coating layer are 800° C.

The powers of the laser lights 9A and 9B are lowered to 400 S/cm$^2$ at a position of 0.6 mm where the first and second laser lights 9A and 9B come very close to each other and they almost reach the irradiation completion position (a center point of one side of the frame-form coating layer opposite to the irradiation initiation position) (109), and the operation of the X stage 36 is stopped in a state where the first and second laser lights 9A and 9B are on the same position at the irradiation completion position (110). At this time, the temperature of the coating layer is 860° C. Then, the irradiation with the laser lights 9A and 9B is terminated (111), and the X stage 36 and the Y stage 37 are returned to the original positions (112).

The above series of operations is preliminarily programmed, and the above-described all steps are conducted automatically upon a push of a starting button after a glass substrate having a coating layer of a sealing material paste formed thereon is placed on the sample table. The state of the coating layer of the sealing material paste fired by the above-described apparatus by the above-described procedure is equal to that of a sample fired in an electric furnace, and the laser sealing property is also equal.

INDUSTRIAL APPLICABILITY

The present invention is applicable to production of a glass member provided with a sealing material layer, or to production of an electric device such as a flat panel display, a liquid crystal display or a dye-sensitized solar cell.

This application is a continuation of PCT Application No. PCT/JP2010/056035 filed on Apr. 1, 2010, which is based upon and claims the benefits of priority from Japanese Patent Application No. 2009-171812 filed on Jul. 23, 2009 and Japanese Patent Application No. 2009-263540 filed on Nov. 19, 2009. The contents of those applications are incorporated herein by reference in their entireties.

REFERENCE SYMBOLS

1: First glass substrate, 1a: surface, 2: second glass substrate, 2a: surface, 3: element region, 4: electronic element portion, 5: first sealing region, 6: second sealing region, 7: sealing material layer, 8: coating layer of sealing material paste, 9: laser light for firing, 9A: first laser light, 9B: second laser light, 10: laser light for sealing, 11: sealing layer, 12: electronic device, 21, 31: laser firing apparatus, 22, 32: sample table, 23, 32: laser light source, 24, 34A, 34B: laser irradiation head, 25, 35: power control portion, 26, 36: X stage, 27, 37, 37A, 37B: Y stage, 28, 38: scanning control part.

What is claimed is:

1. A process for producing an electronic device, the process comprising:
  (i) applying a sealing material paste to a second sealing region in the form of a frame on a second glass substrate, to produce a frame-form coating layer, wherein
    the sealing material paste is prepared by mixing a sealing material with an organic binder,
    the sealing material comprises a sealing glass and a laser absorbent,
    the second glass substrate comprises a second surface comprising the second sealing region which corresponds to a first sealing region on a first glass substrate, and
    the first glass substrate comprises a first surface comprising the first sealing region;
  (ii) irradiating the frame-form coating layer with a laser light for firing to heat the coating layer such that a heating temperature of the sealing material is within a range of at least (T+213° C.) and at most (T+480° C.) relative to a softening temperature T (° C.) of the sealing glass, thereby firing the sealing material while burning out the organic binder, to form a sealing material layer;
  (iii) laminating the first glass substrate and the second glass substrate with the sealing material layer, such that the first surface and the second surface face each other; and
  (iv) irradiating the sealing material layer with a laser light for sealing to melt the sealing material layer and thereby seal an electronic element portion situated between the first glass substrate and the second glass substrate,
wherein:
  the irradiating (iv) of the sealing material layer occurs through the first glass substrate or the second glass substrate;
  the frame-form coating layer is irradiated (ii) with at least one laser light along it such that, relative to the softening temperature T (° C.) of the sealing glass:
    heating temperatures of the coating layer during an irradiation initiation period and during an irradiation completion period are within a range of at least (T+350° C.) and at most (T+550° C.); and
    a heating temperature of the coating layer during a scanning irradiation period is within a range of at least (T+213° C.) and at most (T+480° C.),
    such that a heating temperature of the coating layer during the irradiation initiation period is different than the heating temperature of the coating layer during the scanning irradiation period.

2. The process according to claim 1, wherein the laser light for firing is applied with scanning at a scanning rate within a range of at least 0.1mm/sec and at most 5 mm/sec.

3. The process according to claim 1, wherein a power density of the laser light for firing is controlled such that power densities during the irradiation initiation period and during the irradiation completion period for the laser light for firing are higher than a power density of the laser light for firing during the scanning irradiation period, said scanning irradiation period excluding the irradiation initiation period and the irradiation completion period.

4. The process according to claim 1, wherein:
  the laser light for firing comprises at least one pair of laser lights;
  the at least one pair of laser lights are applied at the same position on an irradiation initiation position of the frame-form coating layer;
  at least one of the laser lights of the at least one pair is applied with scanning along the frame-form coating layer; and
  the at least one pair of laser lights are positioned at the same position on an irradiation completion position of the frame-form coating layer.

5. The process according to claim 4, wherein at least one laser light of the at least one pair of laser lights is constantly applied to the irradiation initiation position while, at the same time, at least one other laser light of the at least one pair of laser lights is applied with scanning along the frame-form coating layer from the irradiation initiation position to the irradiation completion position situated at the same position as the irradiation initiation position.

6. The process according to claim 4, wherein laser lights of at least one pair of laser lights are applied with scanning along the frame-form coating layer, respectively in opposite directions, from the irradiation initiation position to the irradiation completion position, such that the laser lights are at the same position at the irradiation completion position.

7. The process according to claim 1, further comprising disposing a back plate removable from the sealing glass on the frame-form coating layer, followed by the irradiating (ii) of the frame-form coating layer with the laser light for firing.

8. The process according to claim 1, wherein the frame-form coating layer is irradiated (ii) with at least one laser light having a power density within a range of from 200 to 900 W/cm$^2$.

9. The process according to claim 1, wherein:
  the laser light for firing comprises a plurality of pairs of laser lights;
  the frame-form coating layer is divided into a plurality of regions in accordance with the number of the pairs of laser lights;

an irradiation initiation position and an irradiation completion position in each of the plurality of regions are set at positions where said regions are adjacent to each other; and one of the laser lights of each of the plurality of pairs is constantly applied to the irradiation initiation position while, at the same time, the other laser light of each of the respective pairs is applied with scanning along the frame-form coating layer from each irradiation initiation position to each irradiation completion position.

10. The process according to claim 1, wherein:

the laser light for firing comprises a plurality of pairs of laser lights;

the frame-form coating layer is divided into a plurality of regions in accordance with the number of the pairs of laser lights;

an irradiation initiation position is situated at a center portion of each of the plurality of regions, and an irradiation completion position is set at a position where the regions are adjacent to each other; and laser lights of the plurality of pairs are respectively applied to irradiation initiation positions of the plurality of regions, while corresponding laser lights of the each pair are applied respectively in opposite directions from each irradiation initiation position along the frame-form coating layer, such that corresponding laser lights are applied to the same position on the irradiation completion positions.

11. The process according to claim 1, wherein the sealing glass comprises a tin-phosphate glass or a bismuth glass.

12. The process according to claim 11, wherein the sealing glass comprises a tin-phosphate glass comprising:

from 55 to 68 mass% of SnO;
from 0.5 to 5 mass% of $SnO_2$; and
from 20 to 40 mass% of $P_2O_5$, relative to 100 mass% of the tin-phosphate glass.

13. The process according to claim 11, wherein the sealing glass comprises a bismuth glass comprising:

from 70 to 90 mass% of $Bi_2O_3$;
from 1 to 20 mass% of ZnO; and
from 2 to 12 mass% of $B_2O_3$, relative to 100 mass% of the bismuth glass.

* * * * *